United States Patent
Gupta

(10) Patent No.: US 11,256,939 B2
(45) Date of Patent: Feb. 22, 2022

(54) METHODS, SYSTEMS AND COMPUTER PROGRAM PRODUCTS FOR EYE BASED SPOOF DETECTION

(71) Applicant: Arnav Gupta, Fremont, CA (US)

(72) Inventor: Arnav Gupta, Fremont, CA (US)

(*) Notice: Subject to any disclaimer, the term of this patent is extended or adjusted under 35 U.S.C. 154(b) by 0 days.

(21) Appl. No.: 17/495,005

(22) Filed: Oct. 6, 2021

(65) Prior Publication Data
US 2022/0027650 A1     Jan. 27, 2022

(51) Int. Cl.
*G06K 9/00*     (2006.01)
*G06K 9/20*     (2006.01)

(52) U.S. Cl.
CPC ..... *G06K 9/00906* (2013.01); *G06K 9/00604* (2013.01); *G06K 9/2036* (2013.01)

(58) Field of Classification Search
CPC ........... G06K 9/00906; G06K 9/00604; G06K 9/2036
See application file for complete search history.

(56) References Cited

U.S. PATENT DOCUMENTS

| | | | | |
|---|---|---|---|---|
| 2013/0336547 A1* | 12/2013 | Komogortsev | ........ | A61B 5/117 382/117 |
| 2016/0117544 A1* | 4/2016 | Hoyos | ................ | G06K 9/00604 348/78 |
| 2016/0125178 A1* | 5/2016 | Danikhno | ............... | G06F 16/00 726/18 |
| 2018/0349721 A1* | 12/2018 | Agrawal | ............ | G06K 9/00617 |
| 2019/0034606 A1* | 1/2019 | Mapen | ..................... | G06F 21/40 |

FOREIGN PATENT DOCUMENTS

| | | | | |
|---|---|---|---|---|
| CA | 2744757 A1 | * | 6/2009 | ............. G06F 21/32 |
| GB | 2495324 A | * | 4/2013 | ......... G06K 9/00906 |
| WO | WO-2016069879 A1 | * | 5/2016 | ......... H04L 63/0861 |
| WO | WO-2017123702 A1 | * | 7/2017 | ........... G06K 9/2036 |

* cited by examiner

*Primary Examiner* — Carol Wang
(74) *Attorney, Agent, or Firm* — Budzyn IP Law, LLC

(57) ABSTRACT

The invention enables spoof detection in eye based person detection, person recognition, or person monitoring systems. The invention includes (i) illuminating an eye from a first source located at a first position, (ii) illuminating the eye from a second source located at a second position spaced from the first position, (iii) acquiring at the image sensor, a set of images of the eye which includes (a) a first set of image information representing a first specular reflection at a third position relative to the eye, (b) a second set of image information representing a second specular reflection at a fourth position relative to the eye, (iv) determining a difference value representing a difference between the third position and the fourth position, and (v) generating a data signal representing detection of a real eye in response to determining that the difference value is less than a threshold value.

25 Claims, 14 Drawing Sheets

Figure 13(a)                                    Figure 13(b)

METHODS, SYSTEMS AND COMPUTER PROGRAM PRODUCTS FOR EYE BASED SPOOF DETECTION

FIELD OF THE INVENTION

The present invention relates to the domain of person detection, monitoring or recognition. In particular, the present invention provides methods, systems and computer program products for spoof detection of eye(s) to prevent circumvention of person detection, monitoring, or recognition systems.

BACKGROUND

Person detection, recognition, and monitoring systems are being increasingly adopted for safety and security, for example in case of driver monitoring systems, for driver and passenger safety, and in case of access control systems, for authorized user recognition for security.

FIG. 1 illustrates an exemplary person monitoring system 100—which comprises an imaging system 102, a monitoring system 104 and an alert generation system 106, coupled with each other. The imaging system 102 comprises one or more cameras positioned within a premise under observation (e.g. a vehicle) that can be used to detect or monitor occupants in the premise. Monitoring system 104 may be coupled with imaging system 102 and may be configured to receive images captured by the camera(s) within imaging system 102. The monitoring system 104 may be configured such that images received from the cameras may be periodically or continually analyzed to determine occurrence of alarm events. For example, in a driver monitoring system, alarm events may comprise any of driver drowsiness, driver inattention, driver or passenger discomfort, or other risk events. In case that person monitoring system 104 detects an alarm event or a risk event (for example, in a driver monitoring system—any of an unauthorized individual driving or riding in the vehicle, driver drowsiness, driver inattention, or driver or passenger discomfort), an appropriate state signal may be transmitted to alert generation system 106—wherein alert generation system 106 is configured to respond by raising an appropriate alarm or taking remedial action. For example, if driver is detected to be drowsy and also does not respond to alarm, the autopilot system of the vehicle may take over the vehicle driving control and park the vehicle safely.

FIG. 2A illustrates the arrangement of an imaging system within a person monitoring system, wherein an imaging apparatus 202 (for example, a camera) is positioned so as to capture images of a face 206 or one or both eyes within the face 206 of a person 204 positioned in the camera's field of view (for example, a driver or passenger within a vehicle)—for the purposes of person detection, recognition or monitoring.

As shown in FIG. 2B, it has been found that person detection, recognition, or monitoring systems can be circumvented by presenting the imaging apparatus 202 with one or more spoofs or facsimiles of a person. For example, a photograph 208 of a person taken while such person is in an alert state may be positioned or affixed within the field of view of an imaging apparatus 202 that is part of a driver monitoring system—and in which case the imaging apparatus 202 images the photograph 208 of a person instead of the person actually driving the vehicle. The monitoring system thereafter analyses the image of the photograph 208 and is typically unable to distinguish between a real person and a spoof or photograph of a person. As a result, the monitoring system 104 does not detect an abnormal state despite the actual driver of the vehicle being an unauthorized person or a fake spoof—and consequently, the alert generation system 106 would not raise an alarm or take any remedial action.

It is therefore an objective of the present invention to provide safe and effective solutions for spoof detection of a person—particularly for implementation in person detection, recognition or monitoring systems.

SUMMARY

The invention enables spoof detection of a person's eye(s) for implementation in person detection, recognition, or monitoring systems.

The invention provides a method for eye-based spoof detection. The method comprises (i) illuminating an eye positioned within a field of view of an image sensor, with illuminating radiation from a first source of illumination located at a first position, (ii) illuminating the eye with illuminating radiation from a second source of illumination located at a second position that is spaced apart from the first position, (iii) acquiring at the image sensor, a set of images of the eye, wherein the set of images includes (a) a first set of image information corresponding to a first image region representing a first specular reflection at a third position relative to the eye, and (b) a second set of image information corresponding to a second image region representing a second specular reflection at a fourth position relative to the eye, (iv) determining based on image information corresponding to the acquired set of images, a difference value representing a difference between the third position and the fourth position, and (v) generating a data signal representing detection of a real eye in response to determining that the difference value is less than a threshold value.

In an embodiment of the method the set of images comprises a single image, and each of the first specular reflection and the second specular reflection are imaged within the single image.

In another embodiment of the method, the set of images comprises a first image and a second image, and the first specular reflection is imaged within a first image, and the second specular reflection is imaged within the second image.

In a further embodiment of the method, the first specular reflection and the second specular reflection are generated by simultaneously illuminating the eye with illuminating radiation from the first source of illumination and from the second source of illumination.

In a particular embodiment of the method, the first specular reflection and the second specular reflection are generated by successively illuminating the eye with illuminating radiation from the first source of illumination and from the second source of illumination.

Yet further, the method may comprise generating a data signal representing detection of a spoof in response to determining that the difference value is greater than or equal to a threshold value.

In one embodiment of the method, the determination of the difference value is based on analysis of image data within the set of images.

In specific embodiment of the method (i) the first specular reflection is caused by illuminating radiation from the first source of illumination, and (ii) the second specular reflection is caused by illuminating radiation from the second source of illumination.

In another embodiment of the method, (i) the first source of illumination and the second source of illumination are discrete points of illumination on a single illuminator, or (ii) the first source of illumination and the second source of illumination respectively comprise discrete first and second illuminators, or (iii) the first source of illumination and the second source of illumination are both a single source of illumination, and the single source of illumination is configured to direct illuminating radiation through at least a first optical path and a second optical path onto a surface of the eye, such that illuminating radiation delivered from the first optical path to a point on the surface of the eye is incident at said point at an angle from the illuminating radiation delivered from the second optical path at said point on the surface of the eye.

In a particular method embodiment, (i) the first source of illumination and the second source of illumination are arranged such that, the first source of illumination directs illuminating radiation through at least a first optical path onto a point on a surface of the eye, and the second source of illumination directs illuminating radiation through at least a second optical path to said point on the surface of the eye, and the illuminating radiation delivered at said point from the first source of illumination is incident at an angle from the illuminating radiation delivered from the second optical path at said point, wherein said angle exceeds a predefined angular value.

In a further embodiment of the method, (i) the threshold value is determined based on the predefined angular value, or (ii) the threshold value is determined based on the size of the eye/iris in the image and the predefined angular value.

In certain embodiments of the method, the threshold value may be determined based on the predefined angular value and the distance (Z), and wherein the distance (Z) is a distance between the image sensor and the eye.

The invention additionally provides a system for eye-based spoof detection. The system comprises a processor implemented spoof detection controller configured for (i) illuminating an eye positioned within a field of view of an image sensor, with illuminating radiation from a first source of illumination located at a first position, (ii) illuminating the eye with illuminating radiation from a second source of illumination located at a second position that is spaced apart from the first position, (iii) acquiring at the image sensor, a set of images of the eye, wherein the set of images includes (a) a first set of image information corresponding to a first image region representing a first specular reflection at a third position relative to the eye, and (b) a second set of image information corresponding to a second image region representing a second specular reflection at a fourth position relative to the eye, (iv) determining based on image information corresponding to the acquired set of images, a difference value representing a difference between the third position and the fourth position, (v) generating a data signal representing detection of a real eye in response to determining that the difference value is less than a threshold value.

In an embodiment the system may be configured such that the set of images comprises a single image, and each of the first specular reflection and the second specular reflection are imaged within the single image.

In another embodiment the system may be configured such that the set of images comprises a first image and a second image, and the first specular reflection is imaged within a first image, and the second specular reflection is imaged within the second image.

In a further embodiment the system may be configured such that the first specular reflection and the second specular reflection are generated by simultaneously illuminating the eye with illuminating radiation from the first source of illumination and from the second source of illumination.

In a specific embodiment the system may be configured such that the first specular reflection and the second specular reflection are generated by successively illuminating the eye with illuminating radiation from the first source of illumination and from the second source of illumination.

In another embodiment the system may be configured such generating a data signal representing detection of a spoof in response to determining that the difference value is greater than or equal to a threshold value.

The system may be configured such that the determination of the difference value is based on analysis of image data within the set of images.

In certain embodiments, the system may be configured such that (i) the first specular reflection is caused by illuminating radiation from the first source of illumination, and (ii) the second specular reflection is caused by illuminating radiation from the second source of illumination.

In certain further embodiments, the system may be configured such that (i) the first source of illumination and the second source of illumination are discrete points of illumination on a single illuminator, or (ii) the first source of illumination and the second source of illumination respectively comprise discrete first and second illuminators, or (iii) the first source of illumination and the second source of illumination are both a single source of illumination, and the single source of illumination is configured to direct illuminating radiation through at least a first optical path and a second optical path onto a surface of the eye, such that illuminating radiation delivered from the first optical path to a point on the surface of the eye is incident at said point at an angle from the illuminating radiation delivered from the second optical path at said point on the surface of the eye.

In an embodiment of the system, the first source of illumination and the second source of illumination are arranged such that, the first source of illumination directs illuminating radiation through at least a first optical path onto a point on a surface of the eye, and the second source of illumination directs illuminating radiation through at least a second optical path to said point on the surface of the eye, and the illuminating radiation delivered at said point from the first source of illumination is incident at an angle from the illuminating radiation delivered from the second optical path at said point, wherein said angle exceeds a predefined angular value.

The system may also be configured such that (i) the threshold value is determined based on the predefined angular value, or (ii) the threshold value is determined based on the size of the eye/iris in the image and the predefined angular value.

The system may be configured such that (i) the threshold value is determined based on the predefined angular value and the distance (Z), and wherein the distance (Z) is a distance between the image sensor and the eye.

The invention additionally provides, a computer program product for eye-based spoof detection, comprising a non-transitory computer readable medium having a computer readable program code embodied therein, the computer readable program code comprising instructions for (i) illuminating an eye positioned within a field of view of an image sensor, with illuminating radiation from a first source of illumination located at a first position, (ii) illuminating the eye with illuminating radiation from a second source of illumination located at a second position that is spaced apart from the first position, (iii) acquiring at the image sensor, a set of images of the eye, wherein the set of images includes (a) a first set of image information corresponding to a first image region representing a first specular reflection at a third position relative to the eye, (b) a second set of image information corresponding to a second image region representing a second specular reflection at a fourth position relative to the eye, (iv) determining based on image information corresponding to the acquired set of images, a difference value representing a difference between the third position and the fourth position, and (v) generating a data signal representing detection of a real eye in response to determining that the difference value is less than a threshold value.

The computer program product according to the present invention may be configured to perform any one or more of the specific method embodiments of the invention that are described in the following written description.

BRIEF DESCRIPTION OF THE ACCOMPANYING DRAWINGS

FIGS. 12(a)-12(c), 13(a)-13(c) and 14(a)-14(c) are exemplary illustrations of images generated for the purposes of implementing methods of the present invention.

Figure 15:
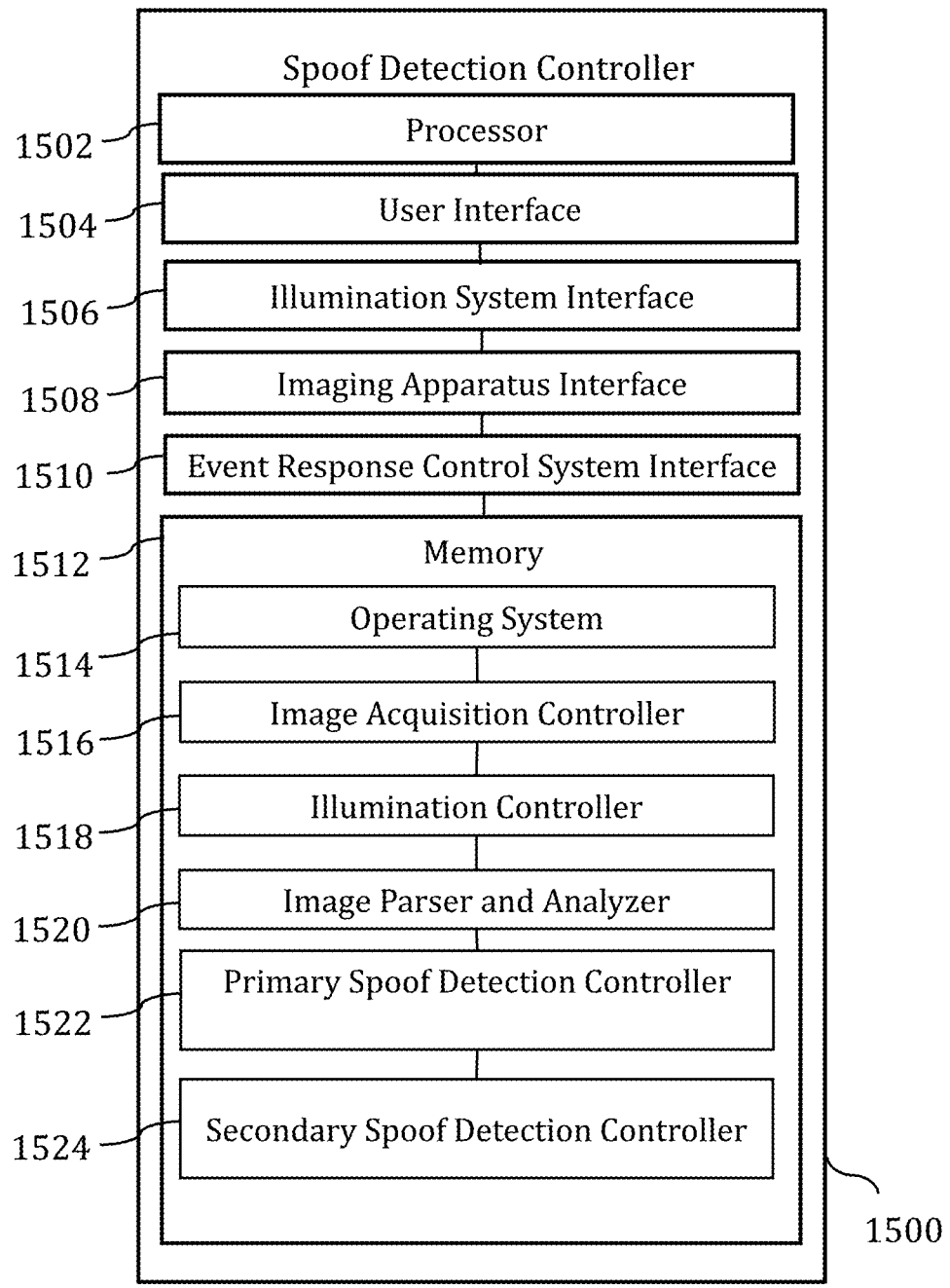

FIG. 15 illustrates an exemplary spoof detection controller configured to implement the methods of the present invention.

Figure 16:
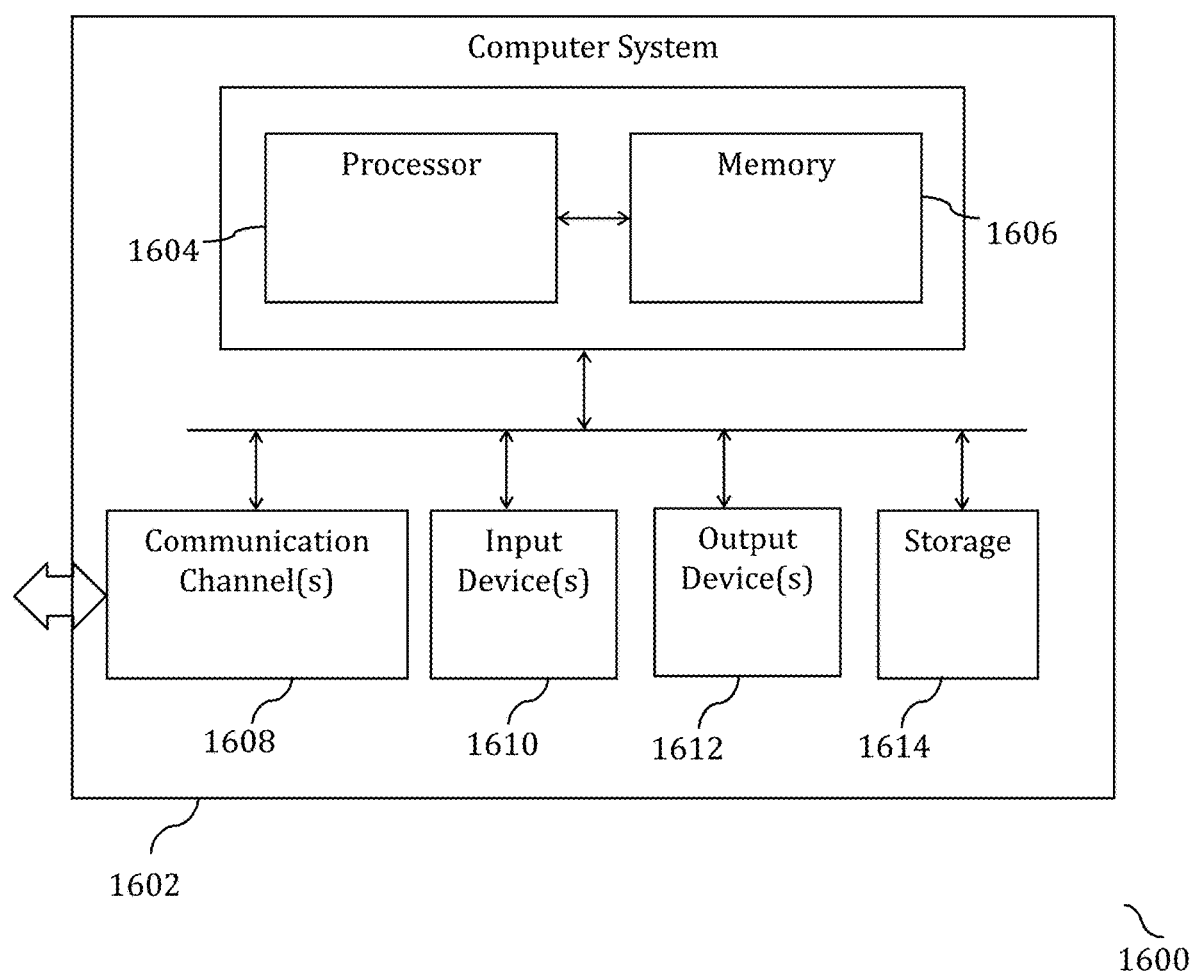

FIG. 16 illustrates an exemplary system for implementing the present invention.

DETAILED DESCRIPTION

The invention enables eye spoof detection within person detection, recognition, or monitoring systems and may be implemented in such systems. In particular embodiments, the invention presents systems, methods and computer program products for spoof detection based on detected properties of reflection patterns on a surface of a person's eye(s).

Figure 1:
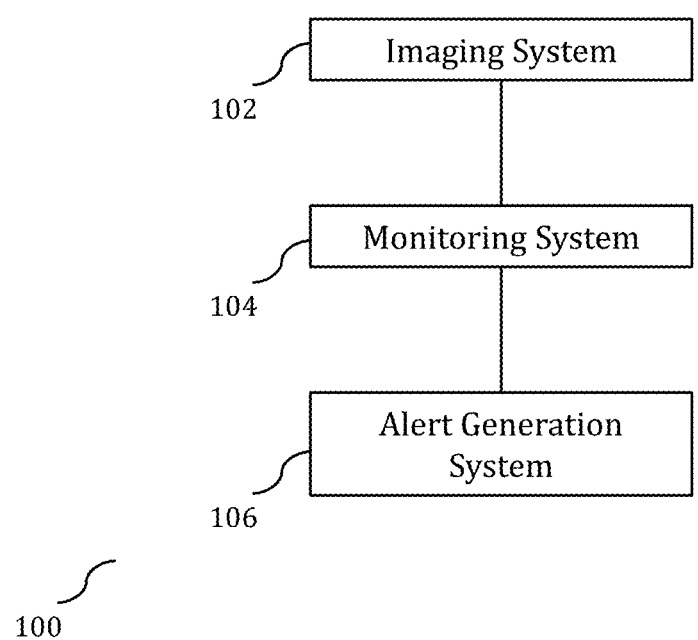
FIG. 1 illustrates a system of a kind that may be used for person monitoring systems.
Figure 2A:
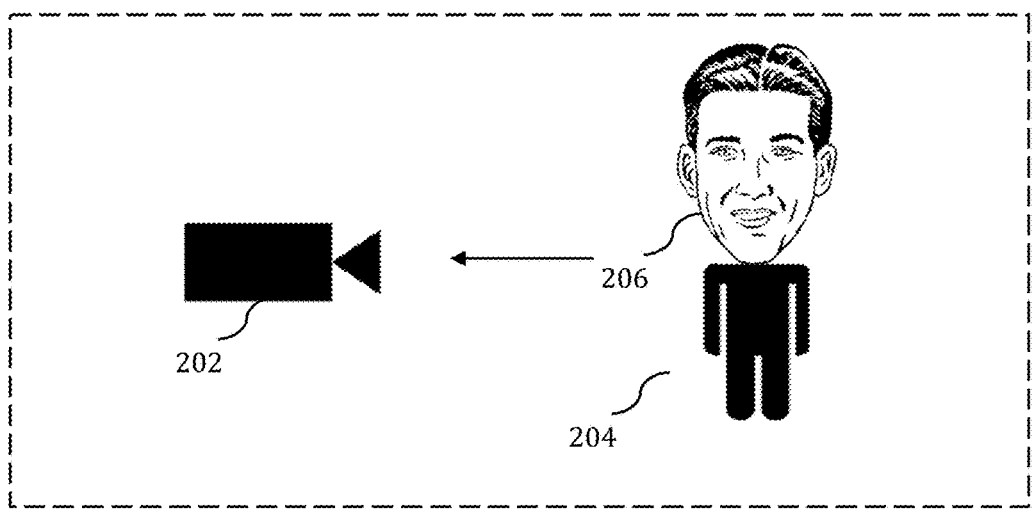
FIG. 2A illustrates a legitimate instance of a person in a person detection, recognition, or monitoring system.
Figure 2B:
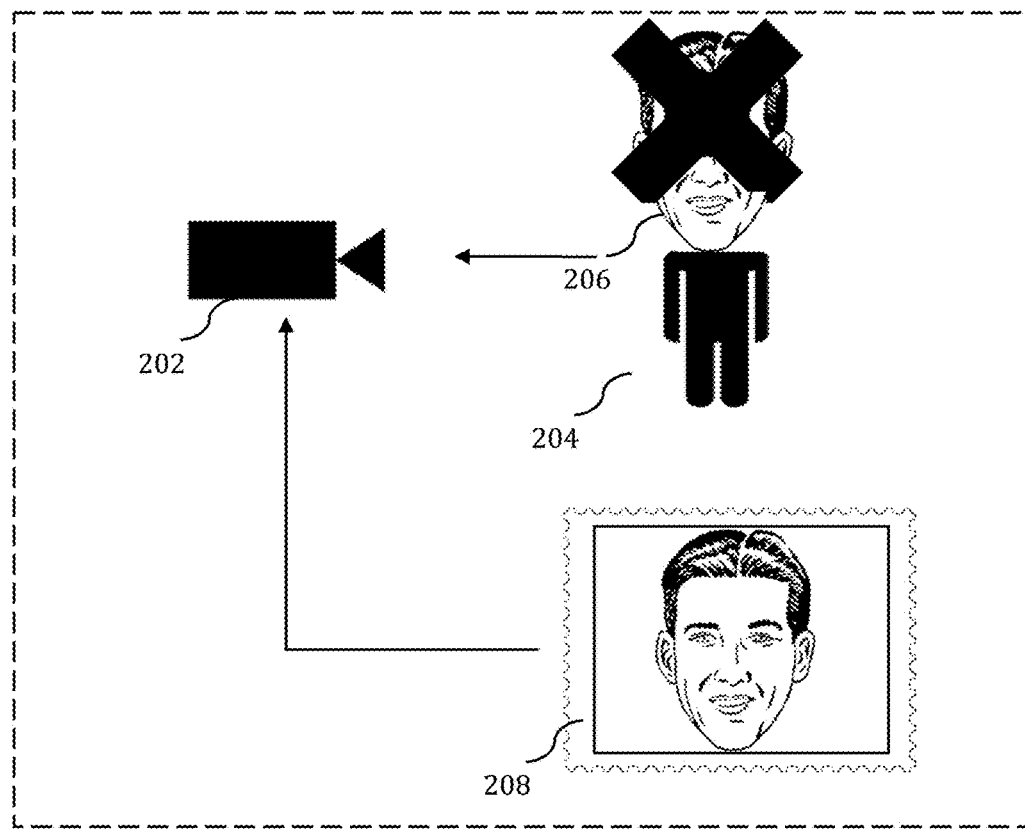
FIG. 2B illustrates an instance of using a spoof image for circumventing systems for person detection, recognition, or monitoring.
Figure 3:
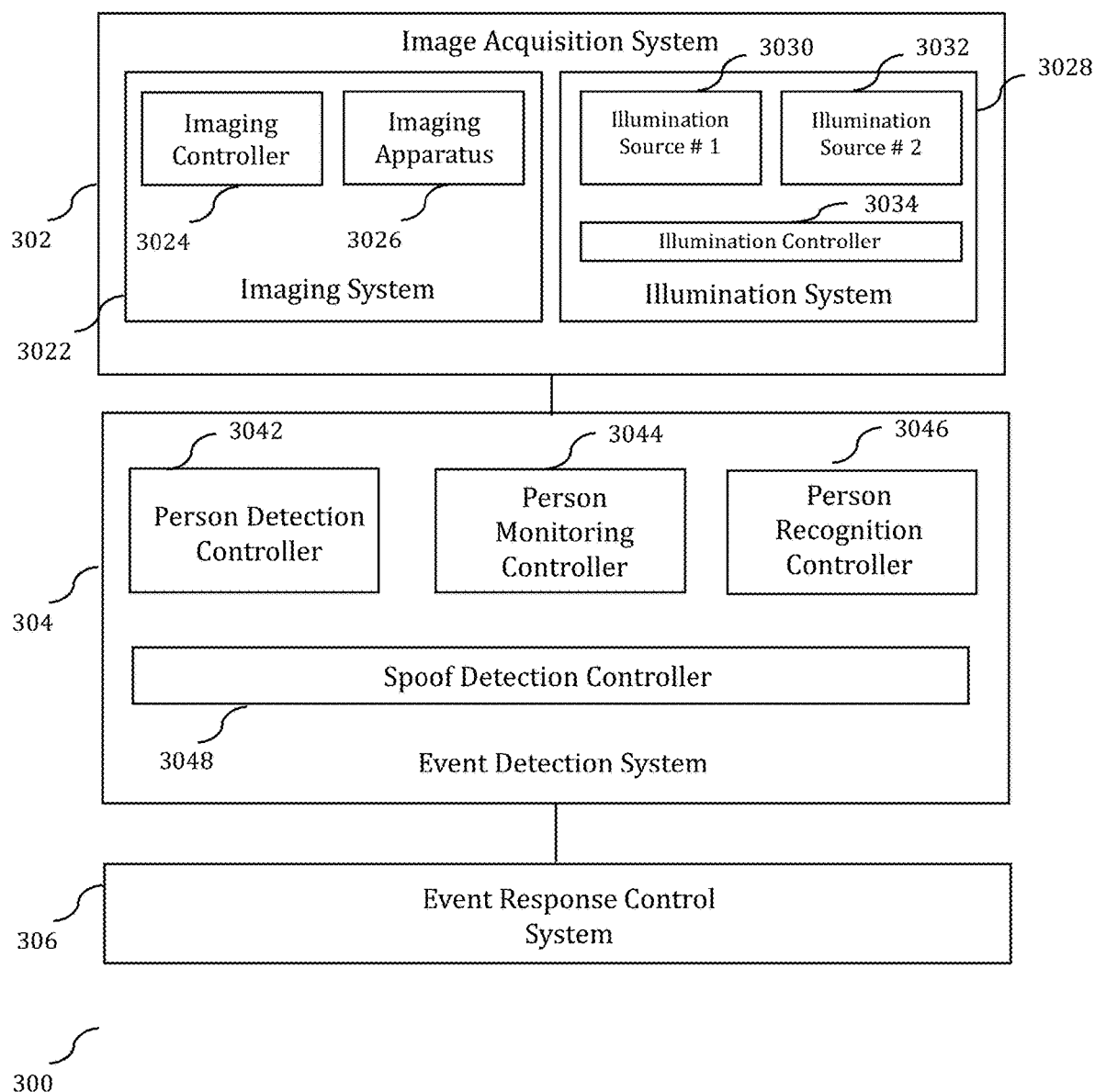
FIG. 3 illustrates a system according to the present invention for performing person detection, recognition, or monitoring.

FIG. 3 illustrates an exemplary system 300 according to the present invention for performing person detection, recognition, or monitoring. Without limitation, in specific embodiments, the system 300 may be configured to use any or all of a human's body part(s) for person detection, recognition or monitoring.

System 300 comprises an image acquisition system 302, an event detection system 304, and an event response control system 306.

Image acquisition system 302 comprises an imaging system 3022 and an illumination system 3028. Imaging system 3022 comprises an imaging controller 3024 and an imaging apparatus 3026. Imaging apparatus 3026 may comprise one or more cameras or image sensors positioned to capture images of a field of view that is intended to be monitored. Imaging apparatus 3026, and the acquisition of images through imaging apparatus 3026 may be controlled by imaging controller 3024—which may comprise a processor implemented controller configured for controlling the operation and operating parameters of imaging apparatus 3026. In various embodiments, imaging controller 3024 may be configured to control one or more of aperture, shutter speed, integration time, optical zoom, digital zoom, optical filtering, and image acquisition functionality of imaging apparatus 3026.

Illumination system 3028 comprises at least a first source of illumination (illumination source #1) 3030 and a second source of illumination (illumination source #2) 3032—which are each configured and positioned to direct illuminating radiations on at least a part of a field of view associated with imaging apparatus 3026. The respective first and second sources of illumination are spaced apart from each other, wherein an first optical path comprising an optical path for illuminating radiation directed from the first source of illumination 3030 and onto the field of view associated with imaging apparatus 3026 is distinct from a second optical path for illuminating radiation directed from the second source of illumination 3032 and onto the field of view associated with imaging apparatus 3026. In an embodiment, each of the first source of illumination 3030 and the second source of illumination 3032 may comprise an illuminator configured to emit radiations having wavelengths falling within the range of 400 nanometres (nm) to 1200 nanometres (nm). In various embodiments, each of the first source of illumination 3030 and the second source of illumination 3032 may comprise any source of illumination—including an incandescent light, laser or a light emitting diode (LED). In various embodiments, (a) the first source of illumination and the second source of illumination are discrete points of illumination on a single illuminator, or (b) the first source of illumination and the second source of illumination respectively comprise discrete first and second illuminators, or (c) the first source of illumination and the second source of illumination are both a single source of illumination, and the single source of illumination is configured to direct illuminating radiation through at least a first optical path and a second optical path onto a surface of the eye, such that illuminating radiation delivered from the first optical path to a point on the surface of the eye is incident at said point at an angle from the illuminating radiation delivered from the second optical path at said point on the surface of the eye.

Illumination system 3028 may additionally include an illumination controller 3034. Illumination controller 3034 may comprise a processor implemented controller configured for controlling the operation and operating parameters of each source of illumination or illuminator within illumination system 3028. In various embodiments, illumination controller 3034 may be configured to control one or more of switching of sources of illumination (e.g. illumination source #1, illumination source #2) between an on-state and an off-state), controlling the intensity and duration of illumination emitted by sources of illumination, and controlling or enabling pulsing of illumination radiations emitted by sources of illumination.

In an embodiment, imaging controller 3024 and illumination controller 3034 may be communicably coupled with each other, and may be configured to operate in cooperation to ensure that images are acquired by imaging apparatus 3026 under appropriate illumination conditions generated by one or more of the sources of illumination 3030, 3032 within illumination system 3028.

Event detection system 304 may be coupled with image acquisition system 302 and may be configured to receive images captured by a camera or image sensor within imaging system 3022. The event detection system 304 may include sub-systems for various forms of event detection, and may be configured to rely on image acquisition of a person positioned within a field of view of imaging apparatus 3026 to determine various characteristics of the person for the purpose of event detection.

Event detection system 304 comprises a processor implemented person detection controller 3042, a processor implemented person monitoring controller 3044, a processor implemented person recognition controller 3046 and a processor implemented spoof detection controller 3048.

Person detection controller 3042 may be configured to parse and analyse image information within one or more images received from image acquisition system 302—and for detecting the presence or absence of a person within the field of view region of imaging apparatus 3026 based on the image information.

Person monitoring controller 3044 may be configured to analyse image information within one or more images received from image acquisition system 302—and for monitoring a state of (or activities of) a person within the field of view region of imaging apparatus 3026 based on the image information. For example, when implemented within a driver monitoring system, person monitoring controller 3044 may be used for the purposes of detecting driver alertness, driver attentiveness to the road, driver health, drowsiness of a driver, inattention or discomfort of the driver, unauthorized or prohibited actions taken by a driver, or other defined risk events.

Person recognition controller 3046 may be configured to extract image data from one or more images received from image acquisition system 302 and compare the extracted data against one or more stored templates of individuals enrolled with the system. Based on the comparison, person recognition controller 3046 may be configured to output a data signal representing a determination whether the generated data matches a previously stored template corresponding to an enrolled individual.

Spoof detection controller 3048 may be configured to acquire or access images captured or generated by image acquisition system 302 and to analyze image data within such images to determine whether the image data represents a person's eye(s) positioned within the field of view of imaging apparatus 3026, or alternatively whether the image data represents a spoof object such as a photograph or other facsimile of a person's eye(s). The configuration, operation and functionality of spoof detection controller 3048 is described in more detail subsequently.

Event response control system 306 is a processor implemented control system communicably coupled with event detection system 304—and which is configured to respond to one or more events or states detected by event detection system 304 with one or more defined event responses. For example, event response control system 306 may be configured to:

respond to detection of an individual, who is not enrolled with person recognition controller 3046, within a field of view of imaging apparatus 3026 by raising an alarm indicating the presence of an unauthorized individual respond to a determination that an object that is presented within a field of view of imaging apparatus 3026 is a spoof or a facsimile of an eye of an individual being monitored by person monitoring controller 3044, by raising an alarm indicating the presentation of a spoof respond to detection and recognition of an individual, who is monitored by event detection system 304, within a field of view of imaging apparatus 3026, by permitting or allowing such individual to access or operate a restricted access system such as a restricted access premise, a restricted access vehicle or a restricted access computing resource, based on access permissions that have been granted to such individual.

As described briefly above, the invention presents systems, methods and computer program products for spoof detection based on detected properties of reflection patterns on a surface of human eye(s). The invention is based on the discovery that analysis of the reflection patterns (such as surface glare or specular reflection patterns) on a surface of an eye can enable accurate determinations regarding whether an object that is present within the field of view of an imaging apparatus is in fact a "real" eye, or is a spoof or copy of an eye.

Figure 4:
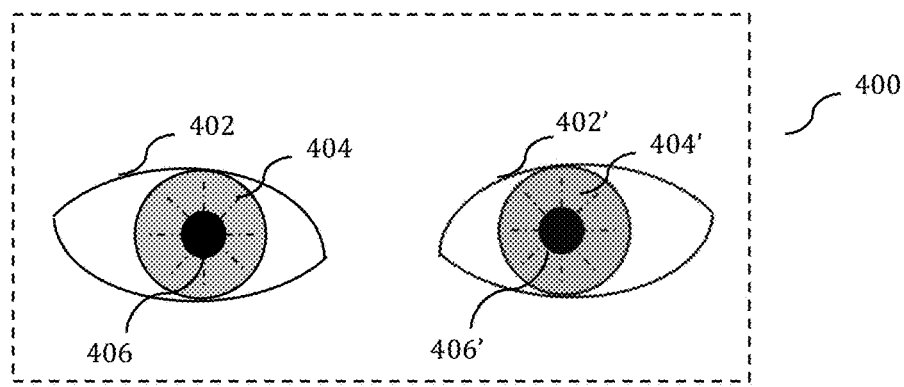
FIG. 4 illustrates exemplary instances of a subject's eyes without any specular reflections.
Figure 5:
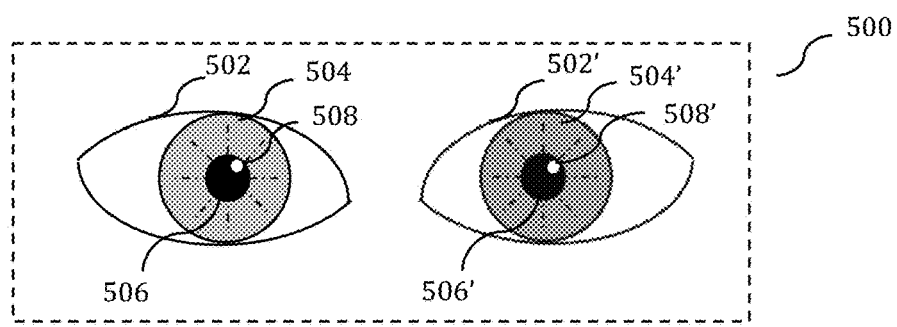
FIGS. 5 and 6 illustrates exemplary instances of a subject's eyes with specular reflections.
Figure 6:
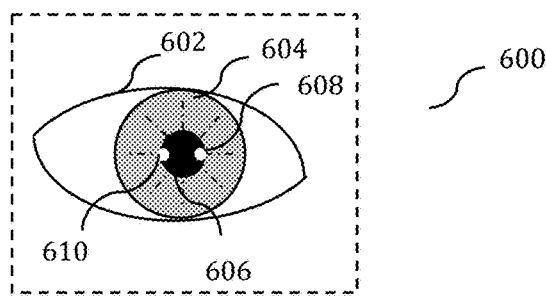

FIGS. 4 to 6 are illustrations to generally explain the incidence of reflection patterns on surfaces of objects. In the illustrations of FIGS. 4 to 6, the object(s) under consideration are a subject's eyes. However, it would be understood that similar reflection patterns could be seen on any object or surface that is not entirely a Lambertian surface. For example, similar reflections could be observed on a subject's forehead, cheek bones', nose etc., or for that matter even on flat surfaces such as the surface of a glossy photograph.

FIG. 4 shows a pair of eyes 400 each comprising sclera 402, 402', iris 404, 404' and pupil 406, 406'. It will be noted that absent appropriate illumination conditions, the surface of eyes 400 do not exhibit specular reflections. In FIG. 5 however, each of the pair of eyes 500 (each comprising sclera 502, 502', iris 504, 504' and pupil 506, 506') includes on its surface a specular reflection 508, 508' caused by reflection of light incident on the surface of pupil 506, 506'—for example, due to reflection of light from an LED illumination source that is positioned to illuminate the pair of eyes 400.

FIG. 6 shows yet another eye 600 comprising sclera 602, iris 604 and pupil 606, 606', including on its surface two discrete specular reflections 608 and 610 that are caused by reflection of light incident on the surface of pupil 606 from two distinct and spaced apart illumination sources (e.g. from two distinct and spaced apart LED illumination sources that are positioned to simultaneously illuminate eye 600).

The invention is premised on the discovery that knowledge of the curvature of a surface of an eye and the positions of at least two sources of illumination (relative to each other or relative to the imaging system) that are used to simultaneously illuminate an eye during image acquisition of an eye by the image sensor, can be used to accurately determine whether the imaged eye is real or fake/spoof.

The invention relies on the characteristic that typically real eyes are not flat surfaces—and instead involve gradual or significant curvature across a given area. The invention further relies on the fact that in case of any pair of distinct sources of illumination that are spaced apart from each other or that direct illuminating radiations onto a field of view region along distinct optical paths, and that are each positioned to illuminate the field of view region of an imaging apparatus or an image sensor, there will necessarily be a difference between (i) a distance between two specular reflections that are caused by light incident from the two sources of illumination on a curved surface positioned within the field of view region at a particular distance, and (ii) a distance between the two specular reflections that are caused by light incident from the same two sources of illumination on a flat (or flatter) surface positioned within the field of view region at the same particular distance.

Thus, the invention enables detection of spoofs by (i) simultaneously illuminating an object positioned within a field of view region of an imaging apparatus with illuminating wavelengths from two sources of illumination that are spaced apart from each other or that direct illuminating radiations onto a field of view region along distinct optical paths, (ii) analyzing image information within an image of the object acquired under such conditions, to determine a distance between two specular reflections resulting from illumination from the two sources of illumination, and (iii) determining whether the determined distance between the two specular reflections is consistent with a curvature of an eye. If the determined distance between the two specular reflections is consistent with a curvature of an eye that is typically expected of, or observed in, the imaged object may be treated as being a real eye. If the determined distance between the two specular reflections is not consistent with a curvature of surface that is typically expected of, or observed in, an eye, the imaged object may be treated as being a spoof or a fake.

Figure 7:
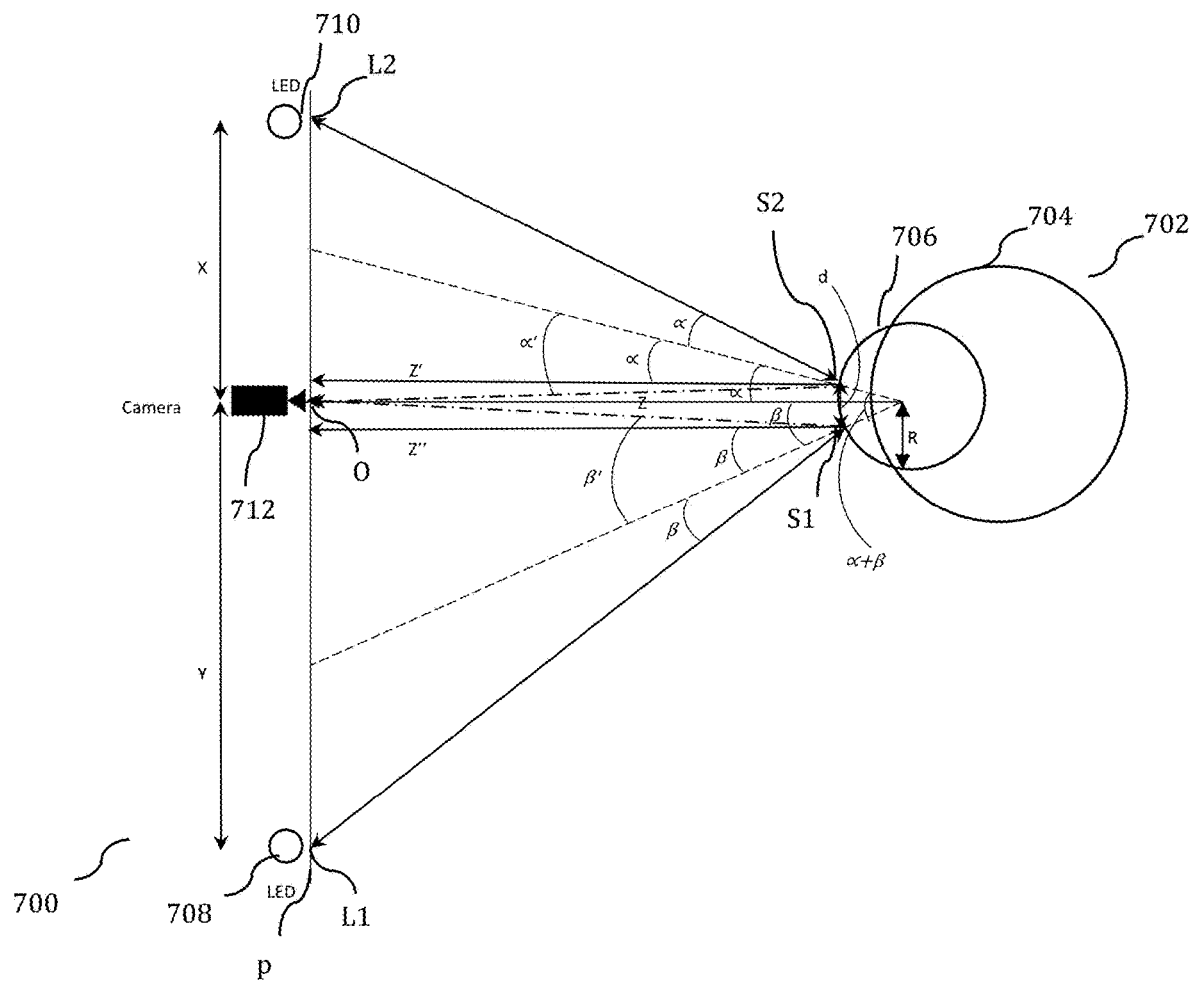
FIGS. 7 and 8 are exemplary ray diagrams for explaining methods of spoof detection that may be implemented in accordance with the teachings of the present invention.
Figure 8:
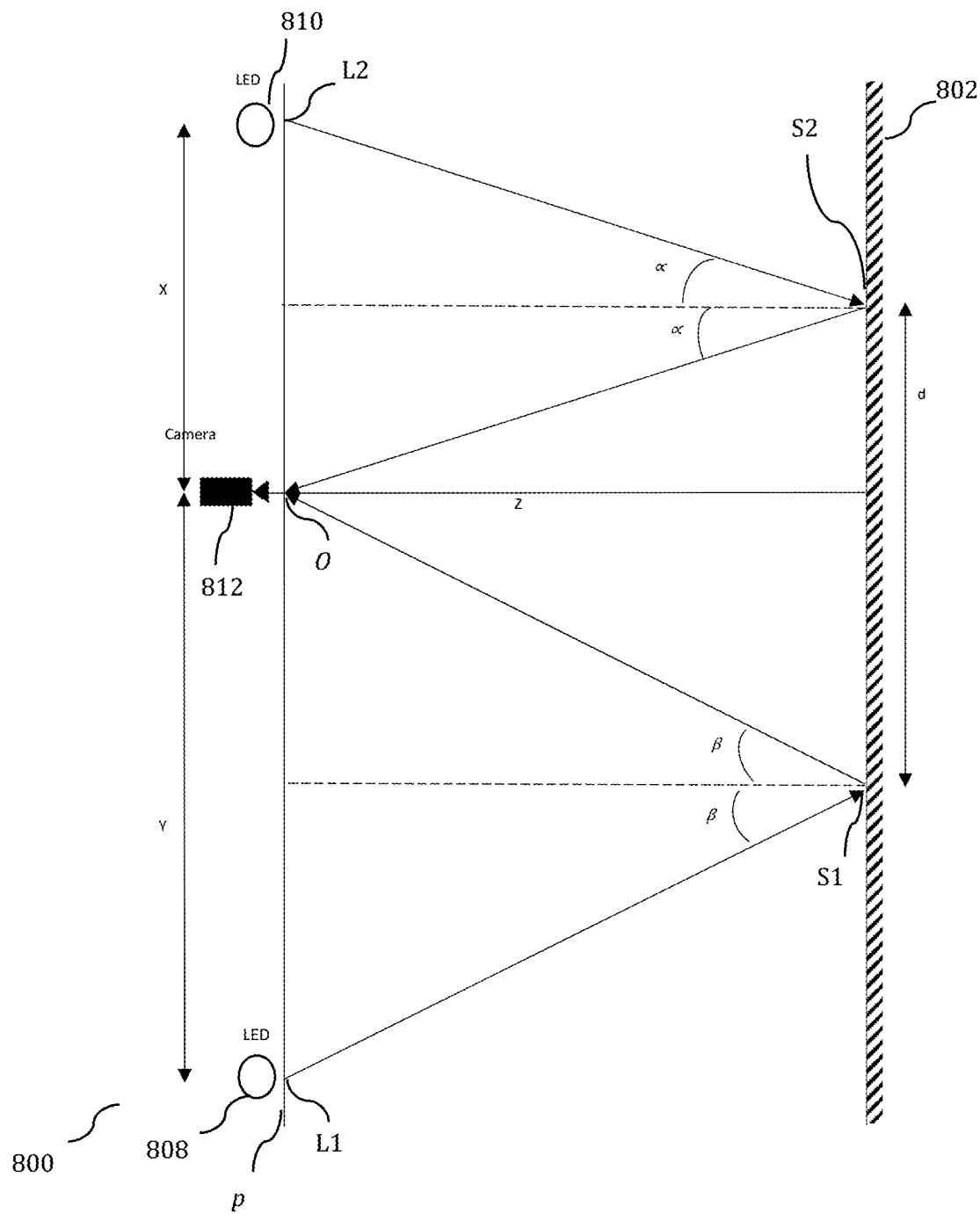

FIGS. 7 and 8 are exemplary ray diagrams for explaining the invention in more detail.

FIG. 7 illustrates an imaging system 700 configured for eye imaging. The imaging system 700 comprises an imaging apparatus 712 (e.g. a camera) and a pair of distinct sources of illumination 708, 712 that are spaced apart from each other. In the illustration of FIG. 7, each of the pair of sources of illumination 708, 712 is an LED positioned and configured so as to emit illuminating radiations that are directed onto a field of view of imaging apparatus 712. However, it would be understood that in various embodiments, (a) the first source of illumination and the second source of illumination comprise any two discrete points of illumination on a single illuminator, or (b) the first source of illumination and the second source of illumination may respectively comprise discrete first and second illuminators, or (c) the first source of illumination and the second source of illumination may both comprise a single source of illumination, and the single source of illumination is configured to direct illuminating radiation through at least a first optical path and a second optical path onto a surface of the eye, such that illuminating radiation delivered from the first optical path to a point on the surface of the eye is incident at said point at an angle from the illuminating radiation delivered from the second optical path at said point on the surface of the eye.

The first source of illumination source 708 is positioned a first distance Y from imaging apparatus 712. The second source of illumination 710 is positioned a second distance x from imaging apparatus 712. Since in the illustration of FIG. 7, the first and second sources of illumination 708, 710 are respectively positioned on opposite sides of imaging apparatus 712, the first source of illumination 708 and the second source of illumination source 710 are spaced apart from each other by the sum of the first distance Y and the second distance X.

In the illustration of FIG. 7, a real eye 702 is positioned within a field of view of imaging apparatus 712. The eye 702 comprises the eyeball 704 and cornea 706—and is positioned such that the cornea 706 is presented in the direction of imaging apparatus 712. The cornea 706 is positioned at a distance Z from a front principal plane of the imaging apparatus 712. As a result, illuminating radiations from the first source of illumination 708 and from the second source of illumination 710 are incident upon cornea 706. The radius of curvature of cornea 706 is represented by R—and which may be taken as constant value anywhere between 7.2 mm and 8.4 mm (in an embodiment approximately 8 mm), since this is the observed range for radius of curvature of the cornea across almost all human eyes.

In the illustration of FIG. 7, illuminating radiations from first source of illumination 708 travel along a first optical path traced by ray L1-S1 from first source of illumination 708 to a first point S1 on the surface of cornea 706. The angle of incidence of the incident illumination radiations travelling along the first optical path L1-S1 from first source of illumination 708 is $\beta$ when incident on cornea 706. The illuminating radiations from first source of illumination 708 that are incident on cornea 706 at first point S1 are reflected off first point S1, and travel along a second optical path traced by ray S1-O in the direction of imaging apparatus 712—where light traveling along second optical path S1-O would result in an imaged first specular reflection within an image of eye 706 that is acquired by imaging apparatus 712. The angle of reflection of the reflected illumination radiations travelling along the second optical path S1-O from cornea 706 to imaging apparatus 712 is $\beta'$ ($\beta' \approx \beta$). The distance between first point S1 on the surface of cornea 706 and the front principal plane within imaging apparatus 712 is $Z''$ ($Z'' \approx Z$).

Further, as shown in the illustration of FIG. 7, illuminating radiations from second source of illumination 710 travel along a third optical path traced by ray L2-S2 from second source of illumination 710 to a second point S2 on the surface of cornea 706. The angle of incidence of the incident illumination radiations travelling along the third optical path L2-S2 from second source of illumination 710 is $\alpha$, when incident on cornea 706. The illuminating radiations from second source of illumination 710 that are incident on cornea 706 at second point S2, are reflected off second point S2, and travel along a fourth optical path traced by ray S2-O in the direction of imaging apparatus 712—where light traveling along fourth optical path S2-O would result in an imaged second specular reflection within an image of eye 706 that is acquired by imaging apparatus 712. The angle of reflection of the reflected illumination radiations travelling along the fourth optical path S2-O from cornea 706 to imaging apparatus 712 is $\alpha'$ ($\alpha' \approx \alpha$). The distance between second point S2 on the surface of cornea 706 and the front principal plane within imaging apparatus 712 is $Z'$ ($Z' \approx Z$).

As a result of the above arrangement, an image of a real eye 720 that is acquired by imaging apparatus 712 when eye 702 or cornea 706 is simultaneously illuminated by first source of illumination 708 and second source of illumination 710 would include two imaged specular reflections—one corresponding to a specular reflection at first point S1 on the surface of cornea 706 and the second corresponding to a specular reflection at second point S2 on the surface of cornea 706.

The distance between first point S1 and second point S2—or between a first specular reflection formed at first point S1 on the surface of cornea 706 and a second specular reflection formed at second point S2 on the surface of cornea 706 is d.

In an embodiment of a kind illustrated in FIG. 7, subsequent calculations can be determined based on some reasonable practical assumptions, including the following:

R≈0.8 cm (which is an average value/typical value for the radius of curvature of a subject's cornea)

Y is a first distance between first source of illumination 708 and a reference point within the input pupil of the imaging apparatus 712

X is a second distance between second source of illumination 710 and the reference point within the input pupil of the imaging apparatus 712 the values of X and Y are known based on design specifications of the imaging system 700

Z is approximately known, and we may therefore use a range of values comprising of values falling between $Z_a$ to $Z_b$ Z»d, and hence Z"≈Z'≈Z, α'≈α, β'≈β

Further the values of α, β, and d respectively may be determined based on the following relationships:

$$\alpha = \tan^{-1}(X/Z)/2 \qquad \text{Equation 2}$$

$$\beta = \tan^{-1}(Y/Z)/2 \qquad \text{Equation 3}$$

$$d = 2R*\sin((\alpha+\beta)/2) \qquad \text{Equation 4}$$

$$d = 2R*\sin((\tan^{-1}(X/Z)+\tan^{-1}(Y/Z))/4) \qquad \text{Equation 5}$$

FIG. 8 illustrates the earlier illustrated imaging system 700 (from FIG. 7) that has been configured for eye imaging. The imaging system 700 comprises an imaging apparatus 712 (e.g. a camera) and a pair of distinct LED sources of illumination 708, 712 that are spaced apart from each other. However, it would be understood that in various embodiments, (a) the first source of illumination and the second source of illumination comprise any two discrete points of illumination on a single illuminator, or (b) the first source of illumination and the second source of illumination may respectively comprise discrete first and second illuminators, or (c) the first source of illumination and the second source of illumination may both comprise a single source of illumination, and the single source of illumination is configured to direct illuminating radiation through at least a first optical path and a second optical path onto a surface of the eye, such that illuminating radiation delivered from the first optical path to a point on the surface of the eye is incident at said point at an angle from the illuminating radiation delivered from the second optical path at said point on the surface of the eye. Each of the pair of sources of illumination 708, 712 is an LED or other source of illuminating radiations, positioned and configured so as to emit illuminating radiations that are directed onto a field of view of imaging apparatus 712. The first source of illumination 708 is positioned a first distance y from imaging apparatus 712. The second source of illumination 710 is positioned a second distance x from imaging apparatus 712. Since in the illustration of FIG. 7, the first and second sources of illumination 708, 710 are respectively positioned on opposite sides of imaging apparatus 712, the first source of illumination 708 and the second source of illumination 710 are spaced apart from each other by the sum of the first distance Y and the second distance X.

In the illustration of FIG. 8, a spoof object comprising a flat photograph or a printed image or a displayed image (for example, an image displayed on an LCD display or other electronic display) 802 of an eye is positioned within a field of view of imaging apparatus 712. The spoof object 802 is a flat object (e.g. a paper surface or a display surface)—and is positioned such that the image of the eye is presented in the direction of imaging apparatus 712. The surface of spoof object 802 on which the image of an eye is printed or displayed is positioned at a distance Z from a reference point within the input pupil within the imaging apparatus 712. As a result, illuminating radiations from the first source of illumination 708 and from the second source of illumination 710 are incident upon this surface of spoof object 802.

In the illustration of FIG. 8, illuminating radiations from first source of illumination 808 travel along a first optical path traced by ray L1-S1 from first source of illumination 708 to a first point S1 on the surface of spoof object 802. The angle of incidence of the incident illumination radiations travelling along the first optical path L1-S1 from first source of illumination 708 is β when incident on the surface of spoof object 802. The illuminating radiations from first source of illumination 708 that are incident on the surface of spoof object 802 at first point S1 are reflected off first point S1, and travel along a second optical path traced by ray S1-O in the direction of imaging apparatus 712—where light traveling along second optical path S1-O would result in an imaged first specular reflection within an image of the spoof object 802 that is acquired by imaging apparatus 712. The angle of reflection of the reflected illuminating radiations travelling along the second optical path S1-O from the surface of spoof object 802 to imaging apparatus 712 is also β.

Further, as shown in the illustration of FIG. 8, illuminating radiations from second source of illumination 710 travel along a third optical path traced by ray L2-S2 from second source of illumination 710 to a second point S2 on the surface of spoof object 802. The angle of incidence of the incident illuminating radiations travelling along the third optical path L2-S2 from second source of illumination 710 is α, when incident on the surface of spoof object 802. The illuminating radiations from second source of illumination 710 that are incident on the surface of spoof object 802 at second point S2 are reflected off second point S2, and travel along a fourth optical path traced by ray S2-O in the direction of imaging apparatus 712—where light traveling along fourth optical path S2-O would result in an imaged second specular reflection within an image of the spoof object 802 that is acquired by imaging apparatus 712. The angle of reflection of the reflected illumination radiations travelling along the fourth optical path S2-O from the surface of spoof object 802 to imaging apparatus 712 is also α.

As a result of the above arrangement, the image of the spoof object 802 that is acquired by imaging apparatus 712 when the spoof objection 802 is simultaneously illuminated by first source of illumination 708 and second source of illumination 710 would include two imaged specular reflections—one corresponding to a specular reflection at first point S1 on the surface of spoof objection 802 and the second corresponding to a specular reflection at second point S2 on the surface of spoof object 802.

The distance between first point S1 and second point S2—or between a first specular reflection formed at first point S1 on the surface of spoof object 802 and a second specular reflection formed at second point S2 on the surface of the surface of spoof object 802 is d. In an embodiment, d satisfies the following relationship:

$$d = X/2 + Y/2 \qquad \text{Equation 6}$$

wherein Y is a first distance between first source of illumination 808 and a reference point within an input pupil of the imaging apparatus 812 wherein X is a second distance between second source of illumination 810 and the reference point within the input pupil of the imaging apparatus 812

Comparing the illustrations in FIGS. 7 and 8, it can be seen that the distance d between the two specular reflections that would be formed on a flat surface (of the kind that may be used to present a spoofed image of an eye) is much greater than the distance d between the two specular reflections that would be formed on a real having curvature of surface—even when the real eye and the flat surface are respectively positioned at the same distance Z from an front principal plane of the imaging apparatus 812.

By way of example:
in the illustration of FIG. 7, if X is 20 cm, Y is 40 cm, and Z is 60 cm, then applying the various relationships expressed in Equations 1 to 5 as applicable, the value of d may be determined, and accordingly d=0.35 cm
on the other hand, in the illustration of FIG. 8, if X is 20 cm, Y is 40 cm, and Z is 60 cm, then applying the relationship in Equation 6, the value of d may be determined, and accordingly d=30 cm Stated differently, the difference in the distance d that would be observed in an eye having curvature of surface, versus the distance d that would be observed in a spoofed image of an eye presented on a flat surface is unmistakable. The present invention uses this characteristic to determine whether an imaged object is in fact a genuine or real eye, or alternatively is a spoof, by predicting a value for d based on known or determined values of X Y and Z and then comparing this predicted value of d against an actual value of d that is determined based on image analysis of an image of the object. If the two values are sufficiently close, and the difference between the two values falls within a predefined acceptable error range, the imaged object is determined to be a genuine or real. If on the other hand, the two values are not sufficiently close, and the difference between the two values falls outside a predefined acceptable error range, the imaged object is determined to be a spoof or a fake eye.

In the illustration of FIG. 7:
if X is 20 cm, Y is 40 cm, and Z is 60 cm, then applying the various relationships expressed in Equations 1 to 5 as applicable, the value of d may be determined, and accordingly d=0.35 cm
if X is 20 cm, Y is 40 cm, and Z is 100 cm, then applying the various relationships expressed in Equations 1 to 5 as applicable, the value of d may be determined, and accordingly d=0.23 cm Therefore, in embodiments of the invention where the object being imaged is a human eye, a decision threshold T may be set as 1 cm, such that if d⇐1 cm, then the imaged eye is real whereas if d>1 cm, the imaged eye can be understood as being a spoof or fake. The units of the decision threshold may be any distance related units, or may be defined in terms of number of image sensor pixels.

Figure 9:
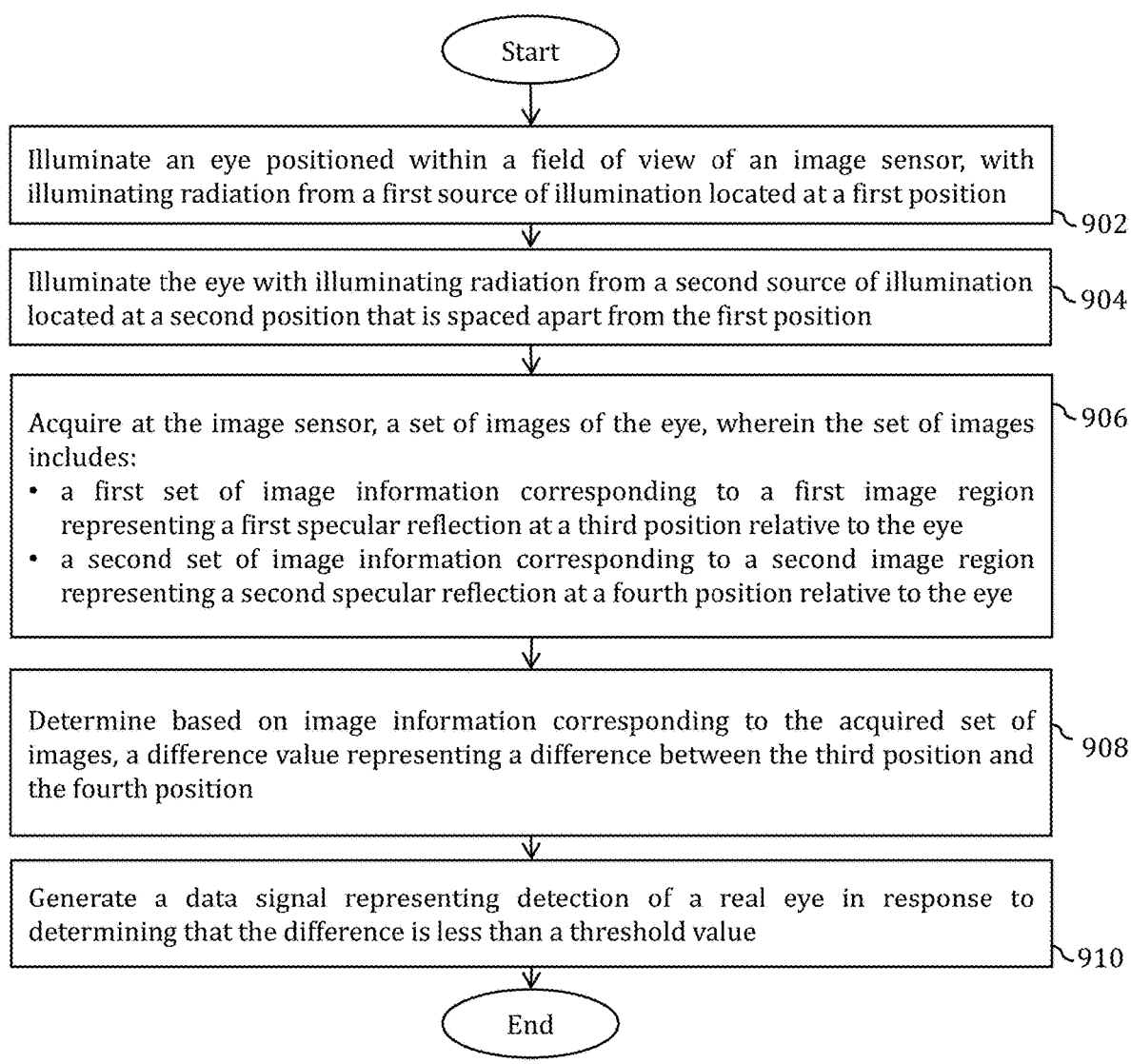
FIG. 9 illustrates a method of spoof detection of a person's eye(s) in accordance with the teachings of the present invention.

FIG. 9 illustrates a method of eye spoof detection in accordance with the teachings of the present invention. In an embodiment, the method of FIG. 9 may be implemented using the imaging system 700 of FIG. 7. In another embodiment the method of FIG. 9 may be implemented within system 300 of FIG. 3.

Step 902 comprises illuminating an eye positioned within a field of view of an image sensor, with illuminating radiation from a first source of illumination located at a first position. In an embodiment, the first source of illumination may comprise first source of illumination 708 of FIG. 7.

Step 904 comprises illuminating the eye with illuminating radiation from a second source of illumination located at a second position that is spaced apart from the first position. In an embodiment, the second source of illumination may comprise second source of illumination 710 of FIG. 7. Step 902 and step 904 may be implemented simultaneously or successively or in a time-phased manner.

Step 906 comprises acquiring at an image sensor (for example at an image sensor within imaging apparatus 712 of FIG. 7), a set of images of the eye, wherein the set of images includes (a) a first set of image information corresponding to a first image region representing a first specular reflection at a third position relative to the eye, and (b) a second set of image information corresponding to a second image region representing a second specular reflection at a fourth position relative to the eye. It will be understood that (i) the set of images may comprise a single image—in which case the first set of image information and the second set of image information are both included within the single image, or (ii) the set of images may comprise a plurality of images—in which case, the first set of image information may be included within a first image and the second set of image information is included within a second image.

Step 908 comprises determining based on image information corresponding to the acquired set of images, a difference value representing a difference between the third position and the fourth position. The difference value determined at step 908 may comprise any of one or more values or value types that represent a separation between the third position and the fourth position.

Figure 14:
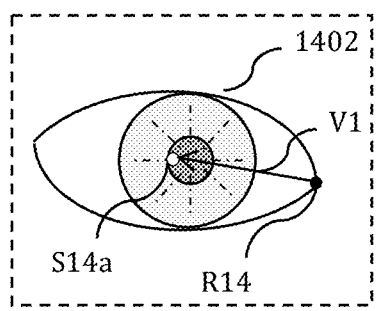
Figure 14:
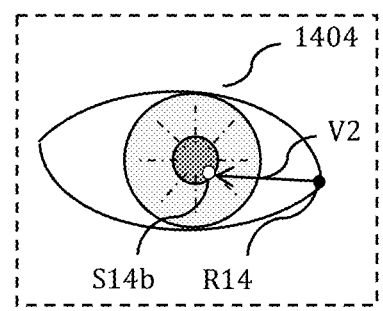
Figure 14C:
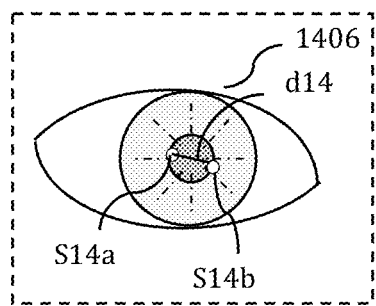

In an embodiment of the type illustrated in FIG. 14(c), wherein within eye image 1406, a first specular reflection S14a is located at a third position and a second specular reflection S14b is located at a fourth position—and the difference value represents a distance d14 between the third position and the fourth position.

Another embodiment of the difference value may be understood based on FIGS. 14(a) and 14(b). FIG. 14(a) illustrates a first eye image 1402 acquired under illumination from a first source of illumination, such that a first specular reflection S14a generated by illumination received from the first source of illumination is formed at a third position—and wherein a location of the third position may be represented by a first position vector V1 that represents the location of the third position with reference to a reference point R14 that corresponds to a fixed reference point within the imaged eye. Likewise, FIG. 14(b) illustrates a second eye image 1404 acquired under illumination from a second source of illumination, such that a second specular reflection S14b generated by illumination received from the second source of illumination is formed at a fourth position—and wherein the location of the fourth position may be represented by a second position vector V2 that represents the location of the fourth position with reference to the fixed reference point R14. In an embodiment of the invention, a difference value according to the teachings of the method of FIG. 9 may be determined based on determining a vector difference between the first position vector V1 and the second position vector V2.

Step 910 comprises generating a data signal representing detection of a real eye in response to determining that the difference is less than a threshold value.

In an embodiment of the method of FIG. 9, the set of images may comprise a single image, and each of the first specular reflection and the second specular reflection are reflected within the single image.

In another embodiment, the set of images comprises a first image and a second image, and the first specular reflection is imaged within a first image, and the second specular reflection is imaged within the second image.

In a further embodiment of the method of FIG. 9, the first specular reflection and the second specular reflection are generated by simultaneously illuminating the eye with illuminating radiation from the first source of illumination and from the second source of illumination.

In yet another embodiment of the method of FIG. 9, the first specular reflection and the second specular reflection are generated by successively illuminating the eye with illuminating radiation from the first source of illumination and from the second source of illumination.

In a particular embodiment, the method of FIG. 9 includes the step of generating a data signal representing detection of a spoof in response to determining that the difference value is greater than or equal to a threshold value.

In another embodiment of the method of FIG. 9, the determination of the difference value is based on analysis of image data within the set of images.

In an embodiment of the method of FIG. 9, the first specular reflection is caused by illuminating radiation from the first source of illumination and/or the second specular reflection is caused by illuminating radiation from the second source of illumination.

In an embodiment of the method of FIG. 9, (a) the first source of illumination and the second source of illumination are discrete points of illumination on a single illuminator, or (b) the first source of illumination and the second source of illumination respectively comprise discrete first and second illuminators, or (c) the first source of illumination and the second source of illumination are both a single source of illumination, and the single source of illumination is configured to direct illuminating radiation through at least a first optical path and a second optical path onto a surface of the eye, such that illuminating radiation delivered from the first optical path to a point on the surface of the eye is incident at said point at an angle from the illuminating radiation delivered from the second optical path at said point on the surface of the eye.

In an embodiment of the method of FIG. 9, the first source of illumination and the second source of illumination are arranged such that, the first source of illumination directs illuminating radiation through at least a first optical path onto a point on a surface of the eye, and the second source of illumination directs illuminating radiation through at least a second optical path to said point on the surface of the eye, and the illuminating radiation delivered at said point from the first source of illumination is incident at an angle from the illuminating radiation delivered from the second optical path at said point, wherein said angle exceeds a predefined angular value.

In a more particular embodiment of the method of FIG. 9, (i) the threshold value may be determined based on the predefined angular value, or (ii) the threshold value is determined based on the size of the eye/iris in the image and the predefined angular value, or (iii) the threshold value is determined based on the predefined angular value and the distance (Z)—wherein the distance (Z) is a distance between the image sensor and the eye.

Figure 10:
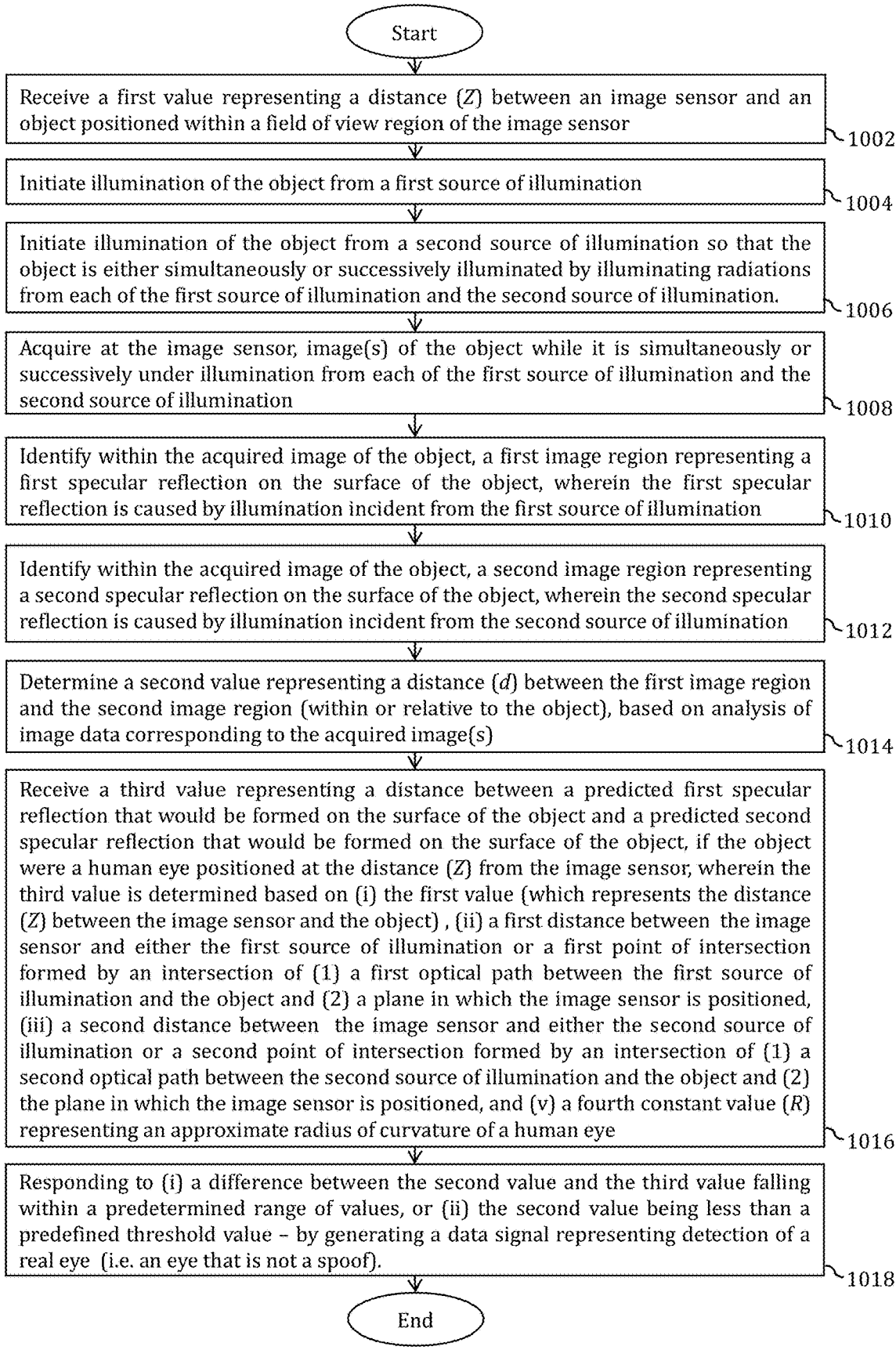
FIG. 10 illustrates a more particular embodiment of the method of eye spoof detection in accordance with the teachings of the present invention.

FIG. 10 illustrates a more particular embodiment of the method of eye based spoof detection that has been described in connection with FIG. 9 above, where the object presented for person detection, recognition, or monitoring is an eye. In an embodiment, the method of FIG. 10 may be implemented using the imaging system 700 of FIG. 7. In another embodiment the method of FIG. 10 may be implemented within system 300 of FIG. 3.

Step 1002 comprises receiving a first value representing a distance Z between an image sensor and an object positioned within a field of view region of the image sensor. The first value may be obtained in any number of different ways. In one alternative, the first value may be obtained by a distance sensing apparatus configured to measure or sense a distance between the image sensor and an object positioned within a field of view region of the image sensor. In another embodiment, estimation of the size of the iris or inter-pupillary distance may be used to implicitly or explicitly compute the value of Z. In another embodiment, the first value may be a predetermined value representing a fixed position or an approximate position at which the object is expected to be positioned at the time of imaging. For example, a person may be guided either by directions provided to such person or based on one or more physical or electronic guide mechanisms to position his/her eye at a specific position (that is located at a predetermined distance from the image sensor) for imaging. In another example, the invention may be performed within a system for driver monitoring—and in which case, the seating arrangement or fixed seats within the vehicle determine the distance at which a person's eye is seated relative to an imaging apparatus at the time of image acquisition of his/her eye(s). In an embodiment, the obtained or determined distance may be received as a first value at a processor configured to implement one or more steps of the method of FIG. 9 or FIG. 10.

Step 1004 comprises initiating illumination of the object from a first source of illumination. In an embodiment, the first source of illumination may comprise first source of illumination 708 of FIG. 7.

Step 1006 comprises initiating illumination of the object from a second source of illumination so that the object is simultaneously or successively illuminated by illuminating radiations from both of the first source of illumination and the second source of illumination. In an embodiment, the second source of illumination may comprise second source of illumination 710 of FIG. 7.

Step 1008 comprises acquiring at the image sensor, one or more images of the object while it is simultaneously or successively under illumination from each of the first source of illumination and the second source of illumination.

Step 1010 comprises identifying within the acquired image(s) of the object, a first image region representing a first specular reflection on the surface of the object, wherein the first specular reflection is caused by illumination incident from the first illumination source.

Step 1012 comprises identifying within the acquired image of the object, a second image region representing a second specular reflection on the surface of the object, wherein the second specular reflection is caused by illumination incident from the second illumination source. In an embodiment, the first and second image regions are identified within a single image of the object. In another embodiment, the first and second image regions are identified based on image information from at least first and second images.

Step 1014 comprises determining a second value representing a distance (d) between the first image region and the second image region, within or relative to the object or a point within the object, based on analysis of image data corresponding to the acquired image(s).

Step 1016 comprises receiving a third value representing a distance between a predicted first specular reflection that would be formed on the surface of the object and a predicted second specular reflection that would be formed on the surface of the object, if the object were a human eye positioned at the distance Z from the image sensor, wherein the third value is determined based on (i) the first value (which represents the distance Z between the image sensor and the object), (ii) a first distance between the image sensor and either the first source of illumination or a first point of intersection formed by an intersection of (1) a first optical path between the first source of illumination and the object and (2) a plane in which the image sensor is positioned, (iii) a second distance between the image sensor and either the second source of illumination or a second point of intersection formed by an intersection of (1) a second optical path between the second source of illumination and the object and (2) the plane in which the image sensor is positioned, and (v) a fourth constant value (R) representing an approximate radius of curvature of a human cornea. In an embodiment the fourth constant value (R) is a value between 7.2 mm and 8.4 mm, and more preferably is 8 mm.

Step 1018 comprises responding to (i) a difference between the second value and the third value falling within a predetermined range of values, or (ii) the second value being less than a predefined threshold value—by generating a data signal representing detection of a real eye (i.e. an eye that is not a spoof). Alternately, responsive to (i) a difference between the second value and the third value falling outside the predetermined range of values, or (ii) the second value being greater than or equal to a predefined threshold value— step 1018 may comprise generating a data signal representing detection of a spoof.

Figure 11:
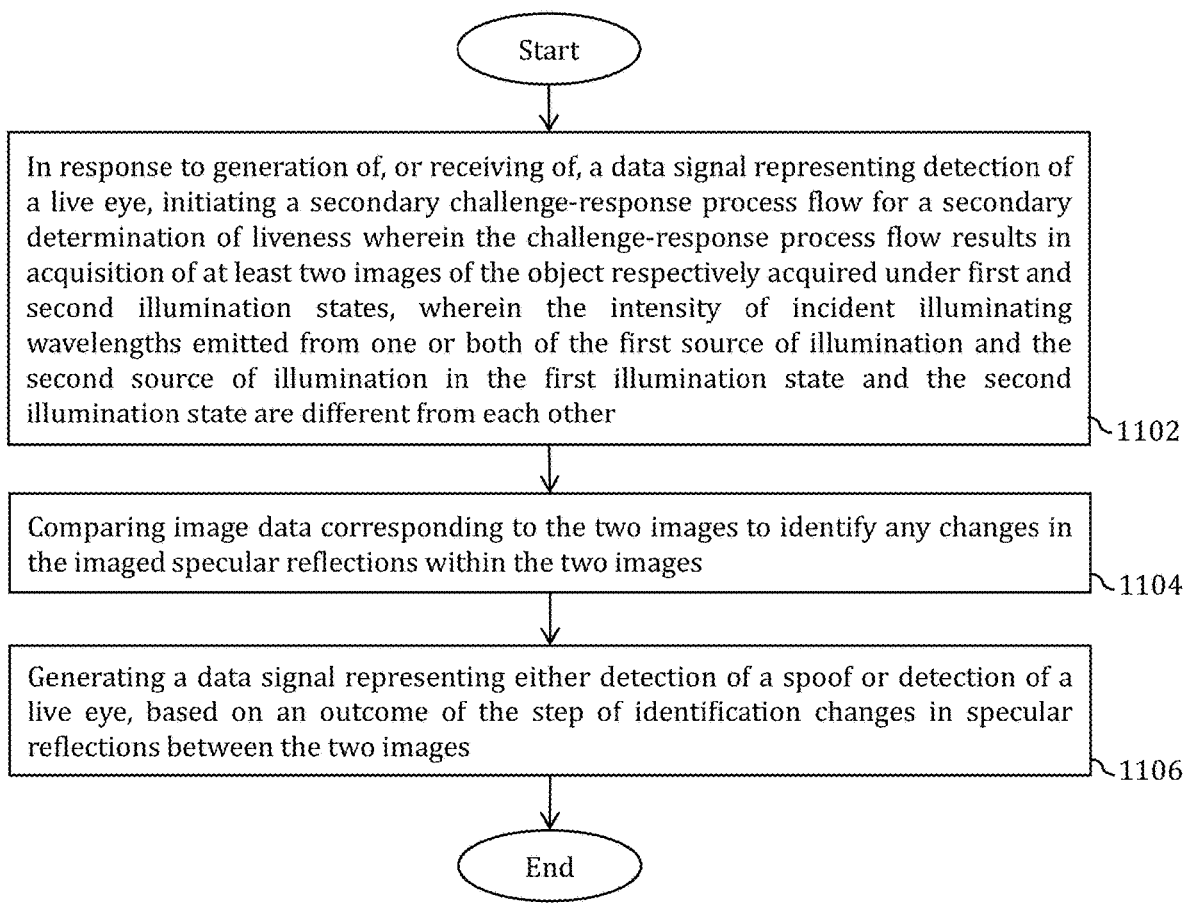
FIG. 11 illustrates a secondary method of eye spoof detection that may be used to confirm the output of the methods of FIG. 9, 10 or 11.
Figure 12A:
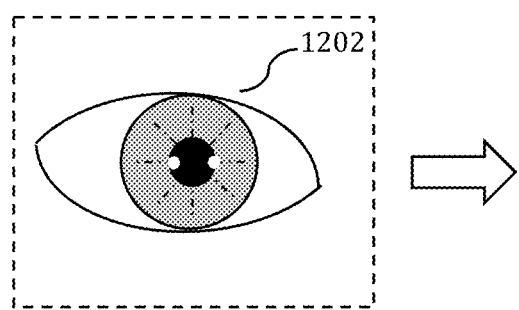
Figure 12B:
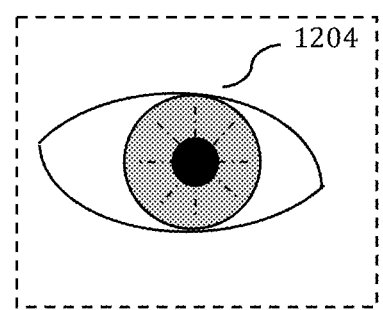
Figure 12C:
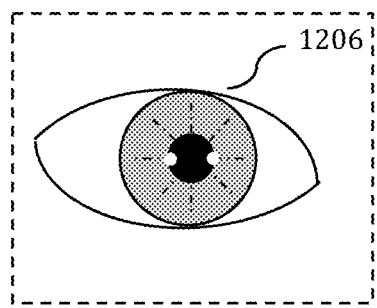
Figure 13C:
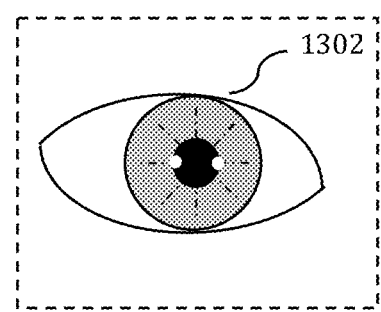
Figure 13C:
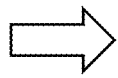
Figure 13C:
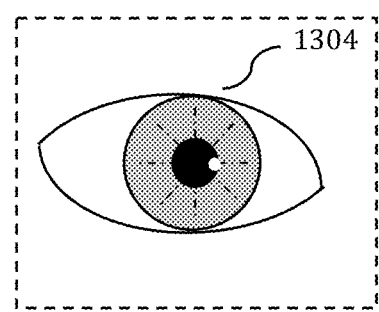
Figure 13C:
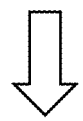
Figure 13C:
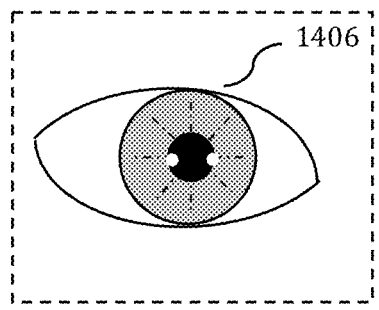

FIG. 11 illustrates a secondary method of spoof detection that may be used to confirm the output of the methods of FIG. 9 or 10. The primary and secondary methods of spoof detection may also be swapped in their order. The method of FIG. 11 may be implemented as a secondary check in case the method of FIG. 9 or 10 has resulted in an output signal that indicates detection or a real eye. In an embodiment, the method of FIG. 11 may be implemented using the imaging system 700 of FIG. 7. In another embodiment the method of FIG. 11 may be implemented within system 300 of FIG. 3. The method of FIG. 11 may be implemented subsequent to performance of the method steps of FIG. 9 or FIG. 10.

Step 1102 comprises responding to generation of, or receiving of, a data signal representing detection of a real eye (see steps 910, 1018 of FIGS. 9, and 10 respectively), by initiating a secondary challenge-response process flow for a secondary determination of spoof wherein the challenge-response process flow results in acquisition of at least two successive images of the object positioned within a field of view of the imaging apparatus. The two images are respectively acquired under first and second illumination states, wherein the intensity or incidence of illuminating wavelengths emitted from one or both of the first source of illumination and the second source of illumination source in the first illumination state and the second illumination state, onto the object, are different from each other. In an embodiment, (i) in the first illumination state, a first source of illumination is in an on-state and is directing illuminating radiations onto the object, while the second source of illumination is in an off-state and/or is not directing illuminating radiations onto the object, and (ii) in the second illumination state, the first source of illumination is in an off-state and/or is not directing illuminating radiations onto the object, while the second source of illumination is in an on-state and is directing illuminating radiations onto the object. In another embodiment, (i) in the first illumination state, both of the first source of illumination and the second source of illumination are in an off-state and/or are not directing illuminating radiations onto the object, and (ii) in the second illumination state, one or both of the first source of illumination and the second source of illumination are in an on-state and are directing illuminating radiations onto the object.

Step 1104 comprises comparing image data corresponding to the two successive images to identify any changes in the imaged specular reflections within the two images. If the object presented in the field of view region of the imaging apparatus is a real eye, the specular reflections detected within the each of the two images would change over the two successive images—due to the change in illumination states of the first and second sources of illumination when acquiring each of the two images. If on the other hand, the object presented in the field of view region of the imaging apparatus is a spoofed eye (such as a printed photograph of an eye or a displayed image of an eye), the spoofed eye will not show a change in specular reflections that matches or corresponds to the change in illumination states of the first and second illumination sources when acquiring each of the two images Step 1106 comprises generating a data signal representing either detection of a spoof, or detection of a real eye, based on an outcome of the step of identification of changes in specular reflections between the two images (or based on the comparison of image data corresponding to the two successive images). In an embodiment, if the two successive images show a change in specular reflections that is consistent with the change in illumination states of the first and second sources of illumination while acquiring the two images respectively, a data signal at step 1106 is generated to represent detection of a real eye. In an embodiment, if the two images show a change in specular reflection that is inconsistent with the change in illumination states of the first and second sources of illumination while acquiring the two images respectively, a data signal at step 1106 is generated to represent detection of a spoofed eye.

FIGS. 12(*a*) to 12(*c*) illustrate a sequence of images of an eye 1202, 1204, 1206 presented for person detection, recognition, or monitoring. The image of FIG. 12(*a*) represents an image 1202 used for the purposes of FIG. 9 or 10 for determining whether the presented eye is a real eye or a spoof. Assuming that analysis of image data from FIG. 12(*a*) (i.e. analysis according to the methods of FIG. 9 or 10) results in generation of a data signal indicating that the presented eye is a real eye (in accordance with step 910 or 1018 of FIG. 9 or 10 respectively), step 1102 of the method of FIG. 11 would thereafter involve acquisition of (i) a first image 1204 shown in FIG. 12(*b*) wherein both of the first source of illumination and the second source of illumination are in off-states, and as a result, the first image 1204 does not include any specular reflection corresponding to either of the two sources of illumination, and (ii) a second image 1206 shown in FIG. 12(*c*) wherein both of the first source of illumination and the second source of illumination are in on-states, and as a result, the second image 1206 includes two discrete specular reflections, each one corresponding to illuminating radiations incident from one of the two sources of illumination respectively.

Step 1104 would thereafter compare image data from the images of FIGS. 12(*b*) and 12(*c*) and since the change in specular reflections across the two images is consistent with the controlled change in illumination states of the first and second illumination sources, step 1106 would comprise generating a data signal representing detection of a real eye.

FIGS. 13(*a*) to 13(*c*) illustrate a second sequence of images 1302, 1304, 1306 of an eye presented for person detection, person recognition, or person monitoring. The image of FIG. 13(*a*) represents an image 1302 used for the purposes of FIG. 9 or 10 for determining whether the presented eye is a real eye or a spoof. Assuming that analysis of image data from FIG. 13(*a*) (i.e. analysis according to the methods of FIG. 9 or 10) results in generation of a data signal indicating that the presented eye is a real eye (in accordance with step 910 or 1018 of FIG. 9 or 10 respectively), step 1102 of the method of FIG. 11 would thereafter involve acquisition of (i) a first image 1304 shown in FIG. 13(*b*) wherein one of the first source of illumination and the second source of illumination is in an on-state and the other is in an off-state, and as a result, the first image 1304 includes only a single specular reflection corresponding to the single source of illumination that is in the on-state, and (ii) a second image 1306 shown in FIG. 13(*c*) wherein both of the first source of illumination and the second source of illumination are in on-states, and as a result, the second image includes two discrete specular reflections, each one corresponding to illuminating radiations incident from one of the two sources of illumination respectively.

Step 1104 would thereafter compare image data from the images of FIGS. 13(*b*) and 13(*c*) and since the change in specular reflections across the two images is consistent with the controlled change in illumination states of the first and second illumination sources, step 1106 would comprise generating a data signal representing detection of a real eye.

In another illustrative example (not shown in the accompanying figures) however, we may assume that a first image of an eye is acquired while one of the first source of illumination and the second source of illumination is in an on-state and the other is in an off-state, but that the first image includes two discrete specular reflections, such as would be expected to be seen in case of incident illuminating radiations from both sources of illumination simultaneously (see for example, the image of FIG. 13(*c*), and (ii) a second image of the eye is acquired wherein both of the first source of illumination and the second source of illumination are in on-states, and this second image also includes two discrete specular reflections (again see for example, the image of FIG. 13(*c*), such as would be expected to be seen in case of incident illuminating radiations from both sources of illumination simultaneously (see for example, the image of FIG. 13(*c*). In this case, the two images would not be showing specular reflections that are consistent with the change in illumination states of the first and second sources of illumination while acquiring the two images respectively, and as a result, a data signal at step 1106 is generated to represent detection of a spoof or a fake eye image.

FIG. 15 illustrates an exemplary spoof detection controller 1500 configured to implement the methods of the present invention. In an embodiment, spoof detection controller 1500 may correspond to spoof detection controller 3048 within event detection system 304 of FIG. 3.

As shown in FIG. 15, spoof detection controller 1500 includes (i) a processor 1502, (ii) a user interface 1504 configured to enable a user or operator to provide data inputs, or control inputs to spoof detection controller 1500, (iii) an illumination system interface 1506 configured to enable spoof detection controller 1500 to communicate with, provide illumination state control instructions to, and receive illumination state information from, first and second illumination sources that are coupled with an imaging system, (iv) an imaging apparatus interface 1508 configured to enable spoof detection controller 1500 to communicate with an imaging apparatus, provide image acquisition instructions to the imaging apparatus, and receive image information corresponding to images acquired by an image sensor within the imaging apparatus, (v) event response control system interface 1510 configured to enable spoof detection controller 1500 to communicate with an event response control system and to transmit to such system, data signals indicating whether an imaged object comprises a real eye or a spoof, and (vi) a memory 1512.

In an exemplary embodiment, memory 1512 may have stored therewithin, one or more of (i) an operating system 1514 configured for managing device hardware and software resources and that provides common services for software programs implemented within spoof detection controller 1500, (ii) an image acquisition controller 1516 configured to control image acquisition by an imaging apparatus, as well as imaging parameters under which the images are acquired, (iii) an illumination controller 1518 configured to control illumination of a field of view of the imaging apparatus by controlling illumination states and/or illumination parameters of first and second illumination sources, (iv) an image parser and analyzer 1520 configured to parse image data from images acquired by an imaging apparatus and for implementing any one or more of step 908 of the method of FIG. 9, steps 1010, 1012 of the method of FIG. 10, and/or step 1104 of the method of FIG. 11, (v) a primary spoof detection controller 1522 configured to implement any one or more of steps 908, 910 of the method of FIG. 9, and/or method steps 1014 to 1018 of the method of FIG. 10, and (vi) a secondary spoof detection controller 1524 configured to implement any one or more of steps 1102 to 1106 of the method of FIG. 11.

FIG. 16 illustrates an exemplary system for implementing the present invention. FIG. 16 illustrates an exemplary system 1600 for implementing the present invention. The illustrated system 1600 comprises computer system 1602 which in turn comprises one or more processors 1604 and at least one memory 1606. Processor 1604 is configured to execute program instructions—and may be a real processor or a virtual processor. It will be understood that computer system 1602 does not suggest any limitation as to scope of use or functionality of described embodiments. The computer system 1602 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1602 in accordance with the present invention may include one or more servers, desktops, laptops, tablets, smart phones, mobile phones, mobile communication devices, tablets, phablets and personal digital assistants. In an embodiment of the present invention, the memory 1606 may store software for implementing various embodiments of the present invention. The computer system 1602 may have additional components. For example, the computer system 1602 may include one or more communication channels 1608, one or more input devices 1610, one or more output devices 1612, and storage 1614. An interconnection mechanism (not shown) such as a bus, controller, or network, interconnects the components of the computer system 1602. In various embodiments of the present invention, operating system software (not shown) provides an operating environment for various softwares executing in the computer system 1602 using a processor 1604, and manages different functionalities of the components of the computer system 1602.

The communication channel(s) 1608 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1610 may include, but is not limited to, a touch screen, a keyboard, mouse, pen, joystick, trackball, a voice device, a scanning device, or any another device that is capable of providing input to the computer system 1602. In an embodiment of the present invention, the input device(s) 1610 may be a sound card or similar device that accepts audio input in analog or digital form. The output device(s) 1612 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 1602.

The storage 1614 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1602. In various embodiments of the present invention, the storage 1614 may contain program instructions for implementing any of the described embodiments.

In an embodiment of the present invention, the computer system 1602 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1602. The method described herein is typically implemented as a computer program product, comprising a set of program instructions that is executed by the computer system 1602 or any other similar device. The set of program instructions may be a series of computer readable codes stored on a tangible medium, such as a computer readable storage medium (storage 1614), for example, diskette, CD-ROM, ROM, flash drives or hard disk, or transmittable to the computer system 1602, via a modem or other interface device, over either a tangible medium, including but not limited to optical or analogue communications channel(s) 1608. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

The invention accordingly enables implementing of effective solutions for spoof detection to prevent circumvention of person detection, person recognition, or person monitoring systems.

The spoof detection solutions of the present invention can be implemented for several different end uses—including by way of example:
person detection (i.e. is a person present within or absent from an environment that is under observation),
person monitoring (i.e. is a person present continuously, and/or continually alert/awake etc. within an environment that is under observation)
person recognition (i.e. is a person who is present within an environment under observation, authorized to be present in that environment)

The spoof detection solutions of the present invention can be used for one or more of such end uses, either individually or simultaneously within a system. For example, in a driver monitoring application, it may be beneficial to check if the driver is authorized to operate a vehicle, and also to check if the driver is awake. In another implementation to only check if the driver is awake, irrespective of who the driver is and whether the driver is authorized to operate the vehicle.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment specifically contemplated, is intended to be practiced in the absence of any element which is not specifically disclosed herein.

What is claimed is:

1. A method for eye-based spoof detection, the method comprising:
illuminating an eye positioned within a field of view of an image sensor, with illuminating radiation from a first source of illumination located at a first position;
illuminating the eye with illuminating radiation from a second source of illumination located at a second position that is spaced apart from the first position;
acquiring at the image sensor, a set of images of the eye, wherein the set of images includes:
a first set of image information corresponding to a first image region representing a first specular reflection at a third position relative to the eye;
a second set of image information corresponding to a second image region representing a second specular reflection at a fourth position relative to the eye;
determining based on image information corresponding to the acquired set of images, a difference value representing a difference between the third position and the fourth position; and
generating a data signal representing detection of a real eye in response to determining that the difference value is less than a threshold value.

2. The method as claimed in claim 1, wherein the set of images comprises a single image, and each of the first specular reflection and the second specular reflection are imaged within the single image.

3. The method as claimed in claim 1, wherein the set of images comprises a first image and a second image, and the first specular reflection is imaged within a first image, and the second specular reflection is imaged within the second image.

4. The method as claimed in claim 1, wherein the first specular reflection and the second specular reflection are generated by simultaneously illuminating the eye with illuminating radiation from the first source of illumination and from the second source of illumination.

5. The method as claimed in claim 1, wherein the first specular reflection and the second specular reflection are generated by successively illuminating the eye with illuminating radiation from the first source of illumination and from the second source of illumination.

6. The method as claimed in claim 1, further comprising generating a data signal representing detection of a spoof in response to determining that the difference value is greater than or equal to a threshold value.

7. The method as claimed in claim 1 wherein the determination of the difference value is based on analysis of image data within the set of images.

8. The method as claimed in claim 1, wherein:
the first specular reflection is caused by illuminating radiation from the first source of illumination; and
the second specular reflection is caused by illuminating radiation from the second source of illumination.

9. The method as claimed in claim 1, wherein:
the first source of illumination and the second source of illumination are discrete points of illumination on a single illuminator; or
the first source of illumination and the second source of illumination respectively comprise discrete first and second illuminators; or
the first source of illumination and the second source of illumination are both a single source of illumination, and the single source of illumination is configured to direct illuminating radiation through at least a first optical path and a second optical path onto a surface of the eye, such that illuminating radiation delivered from the first optical path to a point on the surface of the eye is incident at said point at an angle from the illuminating radiation delivered from the second optical path at said point on the surface of the eye.

10. The method as claimed in claim 1, wherein:
the first source of illumination and the second source of illumination are arranged such that, the first source of illumination directs illuminating radiation through at least a first optical path onto a point on a surface of the eye, and the second source of illumination directs illuminating radiation through at least a second optical path to said point on the surface of the eye, and the illuminating radiation delivered at said point from the first source of illumination is incident at an angle from the illuminating radiation delivered from the second optical path at said point, wherein said angle exceeds a predefined angular value.

11. The method as claimed in claim 10, wherein:
the threshold value is determined based on the predefined angular value;
or the threshold value is determined based on a size of the eye or a size of an iris in the image and the predefined angular value.

12. The method as claimed in claim 10, wherein:
the threshold value is determined based on the predefined angular value and a distance (Z);
wherein the distance (Z) is a distance between the image sensor and the eye.

13. A system for eye-based spoof detection, the system comprising a processor implemented spoof detection controller configured for:
illuminating an eye positioned within a field of view of an image sensor, with illuminating radiation from a first source of illumination located at a first position;
illuminating the eye with illuminating radiation from a second source of illumination located at a second position that is spaced apart from the first position;
acquiring at the image sensor, a set of images of the eye, wherein the set of images includes:
a first set of image information corresponding to a first image region representing a first specular reflection at a third position relative to the eye;
a second set of image information corresponding to a second image region representing a second specular reflection at a fourth position relative to the eye;
determining based on image information corresponding to the acquired set of images, a difference value representing a difference between the third position and the fourth position; and
generating a data signal representing detection of a real eye in response to determining that the difference value is less than a threshold value.

14. The system as claimed in claim 13, configured such that the set of images comprises a single image, and each of the first specular reflection and the second specular reflection are imaged within the single image.

15. The system as claimed in claim 13, configured such that the set of images comprises a first image and a second image, and the first specular reflection is imaged within a first image, and the second specular reflection is imaged within the second image.

16. The system as claimed in claim 13, configured such that the first specular reflection and the second specular reflection are generated by simultaneously illuminating the eye with illuminating radiation from the first source of illumination and from the second source of illumination.

17. The system as claimed in claim 13, configured such that the first specular reflection and the second specular reflection are generated by successively illuminating the eye with illuminating radiation from the first source of illumination and from the second source of illumination.

18. The system as claimed in claim 13, configured for generating a data signal representing detection of a spoof in response to determining that the difference value is greater than or equal to a threshold value.

19. The system as claimed in claim 13, configured such that the determination of the difference value is based on analysis of image data within the set of images.

20. The system as claimed in claim 13, configured such that:
the first specular reflection is caused by illuminating radiation from the first source of illumination; and
the second specular reflection is caused by illuminating radiation from the second source of illumination.

21. The system as claimed in claim 13, configured such that:
the first source of illumination and the second source of illumination are discrete points of illumination on a single illuminator; or the first source of illumination and the second source of illumination respectively comprise discrete first and second illuminators; or the first source of illumination and the second source of illumination are both a single source of illumination, and the single source of illumination is configured to direct illuminating radiation through at least a first optical path and a second optical path onto a surface of the eye, such that illuminating radiation delivered from the first optical path to a point on the surface of the eye is incident at said point at an angle from the illuminating radiation delivered from the second optical path at said point on the surface of the eye.

22. The system as claimed in claim 13, configured such that:

the first source of illumination and the second source of illumination are arranged such that, the first source of illumination directs illuminating radiation through at least a first optical path onto a point on a surface of the eye, and the second source of illumination directs illuminating radiation through at least a second optical path to said point on the surface of the eye, and the illuminating radiation delivered at said point from the first source of illumination is incident at an angle from the illuminating radiation delivered from the second optical path at said point, wherein said angle exceeds a predefined angular value.

23. The system as claimed in claim 22, configured such that:

the threshold value is determined based on the predefined angular value;

or the threshold value is determined based on a size of the eye or a size of an iris in the image and the predefined angular value.

24. The system as claimed in claim 22, configured such that:

the threshold value is determined based on the predefined angular value and a distance (Z);

wherein the distance (Z) is a distance between the image sensor and the eye.

25. A computer program product for eye-based spoof detection, comprising a non-transitory computer readable medium having a computer readable program code embodied therein, the computer readable program code comprising instructions for:

illuminating an eye positioned within a field of view of an image sensor, with illuminating radiation from a first source of illumination located at a first position;

illuminating the eye with illuminating radiation from a second source of illumination located at a second position that is spaced apart from the first position;

acquiring at the image sensor, a set of images of the eye, wherein the set of images includes:

a first set of image information corresponding to a first image region representing a first specular reflection at a third position relative to the eye;

a second set of image information corresponding to a second image region representing a second specular reflection at a fourth position relative to the eye;

determining based on image information corresponding to the acquired set of images, a difference value representing a difference between the third position and the fourth position; and generating a data signal representing detection of a real eye in response to determining that the difference value is less than a threshold value.

* * * * *